US012289475B2

(12) United States Patent
Dinh et al.

(10) Patent No.: US 12,289,475 B2
(45) Date of Patent: Apr. 29, 2025

(54) IMAGE PROCESSING METHOD AND APPARATUS USING NEURAL NETWORK BASED DEBLOCKING FILTERING

(71) Applicant: SAMSUNG ELECTRONICS CO., LTD., Suwon-si (KR)

(72) Inventors: Quockhanh Dinh, Suwon-si (KR); Kwangpyo Choi, Suwon-si (KR); Minwoo Park, Suwon-si (KR); Yinji Piao, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 150 days.

(21) Appl. No.: 17/880,799

(22) Filed: Aug. 4, 2022

(65) Prior Publication Data

US 2023/0044532 A1 Feb. 9, 2023

Related U.S. Application Data

(63) Continuation of application No. PCT/KR2022/011355, filed on Aug. 2, 2022.

(30) Foreign Application Priority Data

Aug. 6, 2021 (KR) ........................ 20-2021-0104200
Apr. 1, 2022 (KR) ........................ 10-2022-0041329

(51) Int. Cl.
*H04N 19/86* (2014.01)
*H04N 19/117* (2014.01)
(Continued)

(52) U.S. Cl.
CPC ........... *H04N 19/86* (2014.11); *H04N 19/117* (2014.11); *H04N 19/182* (2014.11); *H04N 19/187* (2014.11); *H04N 19/80* (2014.11)

(58) Field of Classification Search
CPC .... H04N 19/86; H04N 19/117; H04N 19/182; H04N 19/187; H04N 19/80; H04N 19/159; H04N 19/176
See application file for complete search history.

(56) References Cited

U.S. PATENT DOCUMENTS 7,995,849 B2   8/2011   Raveendran et al.
9,167,269 B2   10/2015  Van der Auwera et al.
(Continued)

FOREIGN PATENT DOCUMENTS

JP   2019-201256 A   11/2019
KR   10-2017-0110557 A   10/2017
(Continued)

OTHER PUBLICATIONS

Marta Karczewicz et al., "VVC In-Loop Filters", IEEE Transactions on Circuits and Systems for Video Technology, vol. 31, No. 10, Digital Object Identifier 10.1109/TCSVT.2021.3072297, Apr. 2021, 19 pages total.
(Continued)

*Primary Examiner* — Joseph W Becker
(74) *Attorney, Agent, or Firm* — Sughrue Mion, PLLC

(57) ABSTRACT

An image processing method and an image processing apparatus are provided to obtain input data for deblocking filtering based on deblocking filtering target pixels of at least one line perpendicular to a boundary line of blocks and encoding information about the deblocking filtering target pixels of at least one line, obtain a feature map of the input data by inputting the input data to a first neural network, obtain a deblocking filter coefficient by inputting the feature map to a second neural network, obtain a deblocking filter compensation value by inputting the feature map to a third neural network, obtain a deblocking filter strength by inputting the input data to a fourth neural network, obtain deblocking filtered pixels by performing deblocking filtering
(Continued)

on the deblocking filtering target pixels of the at least one line using the deblocking filter coefficient, the deblocking filter compensation value, and the deblocking filter strength.

15 Claims, 35 Drawing Sheets

(51) Int. Cl.
    *H04N 19/182* (2014.01)
    *H04N 19/187* (2014.01)
    *H04N 19/80* (2014.01)

(56) References Cited

U.S. PATENT DOCUMENTS

| | | |
|---|---|---|
| 2009/0034622 A1 | 2/2009 | Huchet et al. |
| 2013/0182779 A1 | 7/2013 | Lim et al. |
| 2020/0120340 A1 | 4/2020 | Park et al. |
| 2020/0311870 A1 | 10/2020 | Jung et al. |
| 2021/0099710 A1 | 4/2021 | Salehifar et al. |
| 2021/0127140 A1 | 4/2021 | Hannuksela et al. |
| 2021/0150767 A1 | 5/2021 | Ikai et al. |
| 2023/0141171 A1 | 5/2023 | Jeong et al. |

FOREIGN PATENT DOCUMENTS

| | | |
|---|---|---|
| KR | 1020200016885 A | 2/2020 |
| KR | 10-2155362 B1 | 9/2020 |
| KR | 1020200114436 A | 10/2020 |
| KR | 1020210023006 A | 3/2021 |
| KR | 102272660 B1 | 7/2021 |
| WO | 2019/031410 A1 | 2/2019 |

OTHER PUBLICATIONS

Andrey Norkin et al., "HEVC Deblocking Filter", IEEE Transactions on Circuits and Systems for Video Technology, vol. 22, No. 12, Digital Object Identifier 10.1109/TCSVT.2012.2223053, Oct. 2012, 9 pages total.

International Search Report (PCT/ISA/210) and Written Opinion (PCT/ISA/237) dated Oct. 28, 2022 issued by the International Searching Authority in International Application No. PCT/KR2022/011355.

Extended European Search Report dated Aug. 23, 2024, issued by European Patent Office in European Patent Application No. 22853-408.7.

IMAGE PROCESSING METHOD AND APPARATUS USING NEURAL NETWORK BASED DEBLOCKING FILTERING

CROSS REFERENCE TO RELATED APPLICATIONS

This application claims priority from International Patent Application No. PCT/KR2022/011355, filed on Aug. 2, 2022, which claims priority to Korean Patent Application No. 10-2021-0104200 filed on Aug. 6, 2021, and Korean Patent Application No. 10-2022-0041329 filed on Apr. 1, 2022, in the Korean Intellectual Property Office, the disclosures of which are incorporated herein by reference in their entireties.

BACKGROUND

1. Field

The disclosure relates to an image processing method and an image processing apparatus, and more specifically, to an image processing method and an image processing apparatus capable of removing a blocking artifact occurred by processing a video in a unit of block during a video encoding and decoding process by using artificial intelligence (AI)-based deblocking filtering.

2. Description of the Related Art

In codecs such as H.264 advanced video encoding (AVC) and high efficiency video encoding (HEVC), transformation, prediction and quantization are performed in a block unit, such that visual blocking artifacts occur at boundaries of blocks. A previously determined deblocking filtering algorithm is used to improve image quality by removing blocking artifacts of a reconstructed image. The number of such deblocking filters is limited and each filter has a handcrafted filter coefficient. For example, when no filtering is applied, a filter that modifies 2 pixels, a filter that modifies 4 pixels, and a strong filter that modifies 6 pixels are used, and a previously determined filter coefficient is used for each case. Therefore, deblocking filters of the related art may not be properly applied to various contents having different edges, details, and textures.

That is, as the resolution of an image increases and the content of the image is diversified, a flexible deblocking filtering algorithm using a neural network capable of flexibly considering various characteristics of the image is required.

SUMMARY

One or more example embodiments provide an image processing method and an image processing apparatus using neural network-based deblocking filtering which flexibly generate a neural network-based specific filter with respect to specific pixels based on pixel values and encoding information and thus have an infinite number of filters having coefficients in accordance with the pixel values and the encoding information.

Further, one or more example embodiments provide an image processing method and an image processing apparatus using neural network-based deblocking filtering which not only improve image quality but also improve encoding efficiency by removing a blocking artifact more efficiently through a neural network-based dynamic filter.

According to an embodiment of the disclosure, an image processing method using neural network-based deblocking filtering includes obtain input data for deblocking filtering based on deblocking filtering target pixels of at least one line perpendicular to a boundary line of blocks and encoding information about the deblocking filtering target pixels of at least one line, obtain a feature map of the input data by inputting the input data to a first neural network, obtain a deblocking filter coefficient by inputting the feature map to a second neural network, obtain a deblocking filter compensation value by inputting the feature map to a third neural network, obtain a deblocking filter strength by inputting the input data to a fourth neural network, obtain deblocking filtered pixels by performing deblocking filtering on the deblocking filtering target pixels of the at least one line perpendicular to the boundary line of the blocks using the deblocking filter coefficient, the deblocking filter compensation value, and the deblocking filter strength.

The encoding information may be output through a plurality of fully-connected layers and then is converted to the same size as that of the deblocking filtering target pixels of the at least one line.

The image processing method using neural network-based deblocking filtering may further include determining a scaling factor according to a temporal layer type of a frame comprising the deblocking filtering target pixels of the at least one line and applying the scaling factor to the deblocking filtering.

The determining the scaling factor may include setting the scaling factor for an intra frame to be lower than the scaling factor for a non-intra frame.

The obtaining of the deblocking filtered pixels may include obtaining a matrix multiplication result by performing matrix multiplication of the deblocking filter coefficient and the deblocking filtering target pixels of the at least one line, obtaining a filter compensation result by adding the deblocking filter compensation value to the matrix multiplication result, performing residual deblocking filtering pixels by performing an elementwise product on the filter compensation result using the deblocking filter strength, and obtaining the deblocking filtered pixels by adding the residual deblocking filtering pixels to the deblocking filtering target pixels of the at least one line.

The obtaining of the deblocking filtered pixels may include obtaining a matrix multiplication result by performing matrix multiplication of the deblocking filter coefficient and the deblocking filtering target pixels of the at least one line, obtaining a filter compensation result by adding the deblocking filter compensation value to the matrix multiplication result, and obtaining the deblocking filtered pixels by performing an elementwise product on the filter compensation result using the deblocking filter strength.

The first neural network may include a plurality of residual blocks.

The second neural network may include a first residual block configured to process the feature map to obtain the deblocking filter coefficient.

The third neural network may include a second residual block configured to process the feature map to obtain the deblocking filter compensation value.

The fourth neural network may include a plurality of convolutional layers to process the input data to obtain the deblocking filter strength.

The deblocking filtering target pixels of the at least one line may be 2n pixels including n pixels in one direction perpendicular to the boundary line of blocks and n pixels in another direction perpendicular to the boundary line, and wherein n is a natural number.

The encoding information may include at least one of a coding unit mode, a coding unit size, and a quantization parameter.

The deblocking filter compensation value may not be obtained, and the deblocking filter compensation value may be set to 0.

The deblocking filter strength may not be obtained, and the deblocking filter strength may be set to 1.

The deblocking filter compensation value and the deblocking filter strength may not be obtained, the deblocking filter compensation value may be set to 0, and the deblocking filter strength may be set to 1.

According to an embodiment of the disclosure, an image processing apparatus using neural network-based deblocking filtering includes a memory storing one or more instructions, and a processor configured to operate according to the one or more instructions, wherein the processor may be configured to: obtain input data for deblocking filtering based on deblocking filtering target pixels of at least one line perpendicular to a boundary line of blocks and encoding information about the deblocking filtering target pixels of the at least one line, obtain a feature map of the input data by inputting the input data to a first neural network, obtain a deblocking filter coefficient by inputting the feature map to a second neural network, obtain a deblocking filter compensation value by inputting the feature map to a third neural network, obtain a deblocking filter strength by inputting the input data to a fourth neural network, obtain deblocking filtered pixels by performing deblocking filtering on the deblocking filtering target pixels of the at least one line perpendicular to the boundary line of the blocks using the deblocking filter coefficient, the deblocking filter compensation value, and the deblocking filter strength.

The encoding information may be output through a fully-connected neural network including a plurality of fully-connected layers and then converted to the same size as that of the deblocking filtering target pixels of at least one line.

According to an embodiment of the disclosure, the image processing method and the image processing apparatus using neural network-based deblocking filtering may flexibly generate a neural network-based specific filter with respect to specific pixels based on pixel values and encoding information and thus have an infinite number of filters having coefficients in accordance with the pixel values and the encoding information.

According to an embodiment of the disclosure, the image processing method and the image processing apparatus using neural network-based deblocking filtering may not only improve image quality but also improve encoding efficiency by removing a blocking artifact more efficiently through a neural network-based dynamic filter.

DETAILED DESCRIPTION

Figure 1:
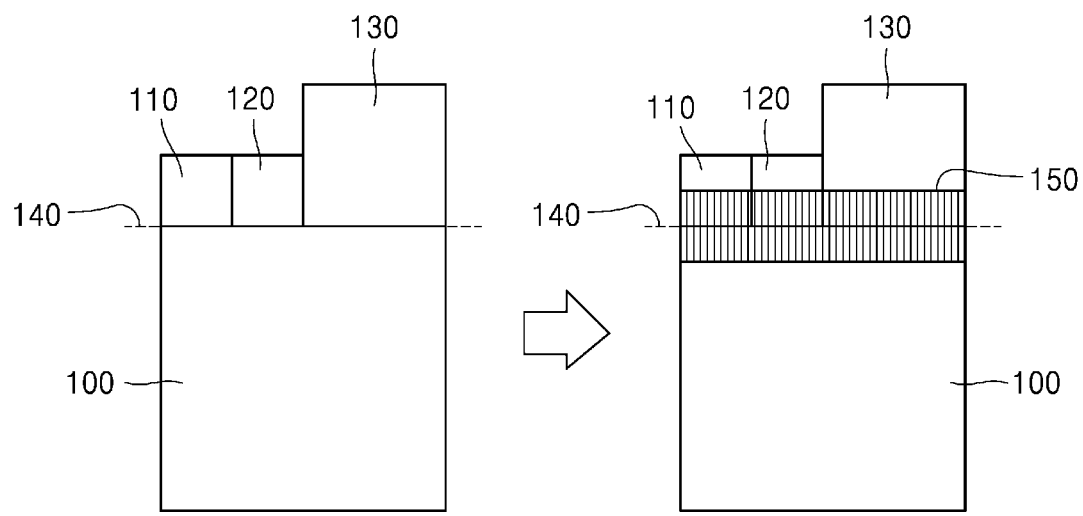
FIG. 1 is a diagram illustrating deblocking target pixels at a boundary of blocks according to an embodiment of the disclosure.

Throughout the disclosure, the expression "at least one of a, b or c" indicates only a, only b, only c, both a and b, both a and c, both b and c, all of a, b, and c, or variations thereof.

As the disclosure allows for various changes and numerous examples, particular embodiments will be illustrated in the drawings and described in detail in the written description. However, this not intended to limit the disclosure to particular modes of practice, and it will be understood that all changes, equivalents, and substitutes that do not depart from the spirit and technical scope of the disclosure are encompassed in the disclosure.

In the description of embodiments, certain detailed explanations of related art are omitted when it is deemed that they may unnecessarily obscure the essence of the disclosure. Also, numbers (for example, a first, a second, etc) used in the description of the specification are merely identifier codes for distinguishing one element from another.

Also, in the disclosure, it will be understood that when elements are "connected" or "coupled" to each other, the elements may be directly connected or coupled to each other, but may alternatively be connected or coupled to each other with an intervening element therebetween, unless specified otherwise.

In the disclosure, regarding an element represented as a "unit" or a "module", two or more elements may be combined into one element or one element may be divided into two or more elements according to subdivided functions. In addition, each element described hereinafter may additionally perform some or all of functions performed by another element, in addition to main functions of itself, and some of the main functions of each element may be performed entirely by another component.

Also, in the disclosure, an 'image' or a 'picture' may denote a still image (or a frame), a moving image including a plurality of consecutive still images, or a video.

Also, in the disclosure, a neural network is a representative example of an artificial neural network model simulating brain nerves, and is not limited to an artificial neural network model using a specific algorithm. The neural network may also be referred to as a deep neural network (DNN).

Also, in in the disclosure, a 'weight' is a value used in a calculation process at each of layers constituting a neural network, and may be used to, for example, apply an input value to a certain formula. A weight value that is a value set as a result of training may be updated through separate training data when necessary.

Also, in the disclosure, a 'current block' denotes a current block that is a processing target. The current block may be a slice, a tile, a maximum coding unit, an coding unit, a prediction unit, or a transformation unit split from a current image.

Also, in the disclosure, a 'sample' denotes data assigned to a sampling position in an image, a block, a filter kernel, a feature map, and refers to data that is a processing target. For example, the sample may include pixels in a two-dimensional image.

FIG. 1 is a diagram illustrating deblocking target pixels at a boundary of blocks according to an embodiment of the disclosure.

Referring to FIG. 1, when block-based transformation, prediction, and quantization are performed, a blocking artifact occurs at a boundary 140 of blocks between a current block 100 and neighboring blocks 110, 120, and 130. Deblocking filtering is required to improve image quality by removing such a blocking artifact.

The target pixels of deblocking filtering are pixels 150 of one line or a plurality of lines which is a set of pixels perpendicular to a boundary line of blocks. At least one decoded line perpendicular to the boundary line of blocks is extracted and filtered.

Instead of directly generating pixel values like other neural networks, each pixel is filtered using an adaptive and linear filter with respect to each pixel dependent on encoding information (e.g., a coding unit mode, a coding unit size, quantization parameters) and neighboring decoded pixel values.

Figure 2:
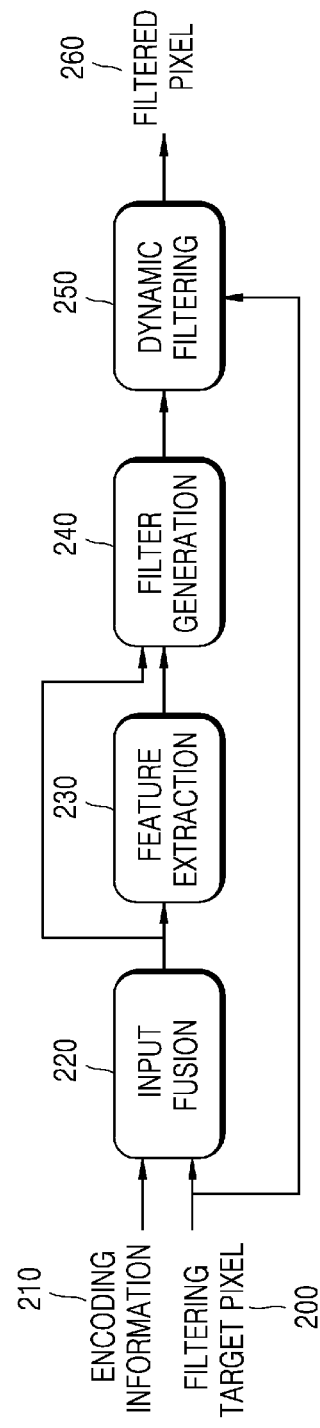
FIG. 2 is a diagram illustrating neural network-based deblocking filtering according to an embodiment of the disclosure.

FIG. 2 is a diagram illustrating neural network-based deblocking filtering according to an embodiment of the disclosure.

Referring to FIG. 2, in neural network-based deblocking filtering according to an embodiment of the disclosure, input fusion 220 that fuses input data for deblocking filtering is performed based on encoding information 210 of a filtering target pixel 200 and the filtering target pixel 200. The encoding information 210 includes a coding unit mode and a coding unit size of the filtering target pixel 200, and quantization parameters. Then, in order to extract feature information of an input for generating a filter coefficient, a feature map is extracted by performing feature extraction 230 on the input data merged through the input fusion 220 through a neural network. For filter generation 240, a filter coefficient, a filter compensation value, and a filter strength that improve objective image quality and subjective image quality are determined using the merged input data and the extracted feature map, and dynamic filtering 250 is performed using the filter coefficient, the filter compensation value, and the filter strength that are determined through a process of filter generation 240 and the filtering target pixel 200, and thus a filtered pixel 260 is obtained.

Figure 3:
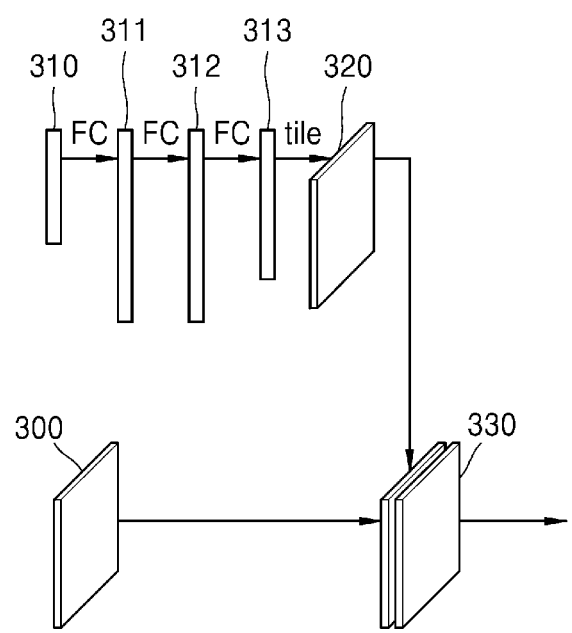
FIG. 3 is a diagram illustrating a process of fusing input data with respect to pixels and input data with respect to encoding information according to an embodiment of the disclosure.

FIG. 3 is a diagram illustrating a process of fusing input data with respect to pixels and input data with respect to encoding information according to an embodiment of the disclosure.

Referring to FIG. 3, a pixel value range of filtering target pixels 300 is [0, $2^{bitdepth}$-1], and encoding information 310 with respect to the filtering target pixels 300, which is encoding information of an coding unit, may include information about coding unit modes indicating intra mode, inter mode, and skip mode of neighboring blocks and a current block, and encoding sizes of 4, 8, 16, 32, 64, 128, etc. Also, the encoding information 310 may include quantization parameter values of neighboring blocks and a quantization parameter value of the current block. As an input of the neural network, a plurality of pieces of encoding information are used instead of one or several pieces of encoding information.

Because the filtering target pixels 300 and the encoding information 310 are in different domains, a multimodal combination of expressing data collected from various sources as one piece of information is required. That is, instead of concatenating the encoding information 310 with the filtering target pixels 300, separate processing is required on the encoding information before fusion to pixel values.

In FIG. 3, a neural network including a plurality of fully-connected layers is used before merging the encoding information 310 to the filtering target pixels 300. Specifically, the encoding information 310 is input to a first set of fully-connected layers FC so that a first intermediate feature map 311 is obtained, the first intermediate feature map 311 is input to a second set of fully-connected layers FC so that a second intermediate feature map 312 is obtained, and the second intermediate feature map 312 is input to a third set of fully-connected layers FC, so that a third intermediate feature map 313 is obtained. Values of the third intermediate feature map 313 are tiled, that is, rearranged, to the same size as the filtering target pixels 300, and thus encoding information data 320 of the same domain as that of the filtering target pixels 300 is obtained. The filtering target pixels 300 and the encoding information data 320 are merged to obtain merged input data 330, and thus input fusion is completed.

Such an input fusion method may be used for other neural networks in addition to neural network-based deblocking filtering. This will be described below in FIGS. 4 and 5.

Figure 4:
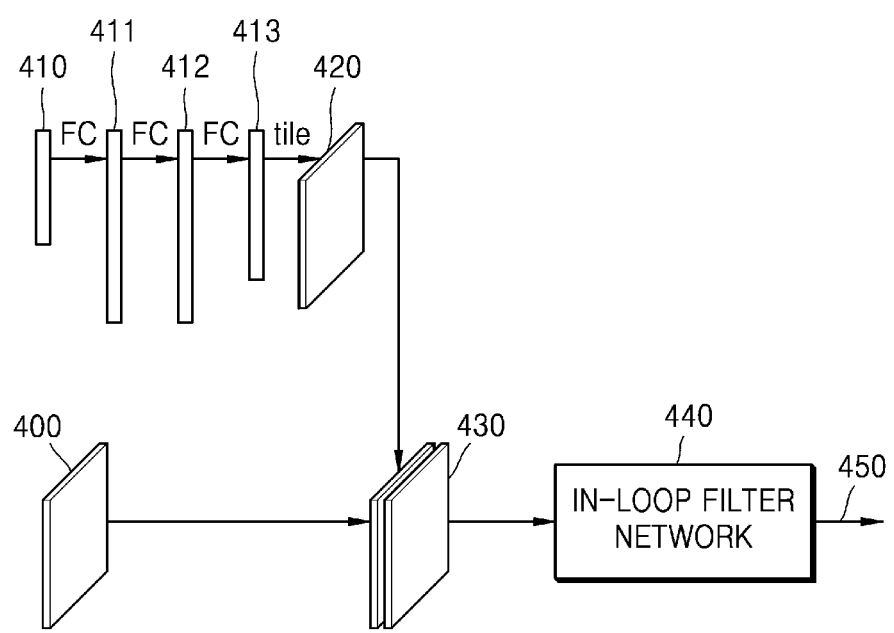
FIG. 4 is a diagram illustrating a process of fusing input data input to an in-loop filter network according to another embodiment of the disclosure.

FIG. 4 is a diagram illustrating a process of fusing input data input to an in-loop filter network according to another embodiment of the disclosure.

Referring to FIG. 4, merge input data 430 with respect to an in-loop filter network 440 is generated by fusing in-loop filtering target pixels 400 and encoding information 410 with respect to the in-loop filtering target pixels 400. The in-loop filtering target pixels 400 may be pixels before deblocking filtering, pixels after deblocking filtering, pixels after sample adaptive offset (SAO) filtering, or pixels after adaptive loop filtering (ALF). The encoding information 410 may include quantization parameters of neighboring blocks, a quantization parameter of a current block, coding unit modes (intra mode, inter mode, etc.) of neighboring blocks, an coding unit mode of the current block, etc.

Similarly to FIG. 3, in FIG. 4, a neural network including a plurality of fully-connected layers is used before merging the encoding information 410 to the in-loop filtering target pixels 400. Specifically, the encoding information 410 is input to a first set of fully-connected layers FC so that a first intermediate feature map 411 is obtained, the first intermediate feature map 411 is input to a second set of fully-connected layers FC so that a second intermediate feature map 412 is obtained, and the second intermediate feature map 412 is input to a third set of fully-connected layers FC, so that a third intermediate feature map 413 is obtained. Values of the third intermediate feature map 413 are tiled, that is, rearranged, to the same size as the in-loop filtering target pixels 400, and thus encoding information data 420 of the same domain as that of the in-loop filtering target pixels 400 is obtained. The in-loop filtering target pixels 400 and the encoding information data 420 are merged to obtain merged input data 430, and thus input fusion is completed.

The merged input data 430 is input to an in-loop filter network 440 for in-loop filtering, and thus in-loop filtered pixels 450 are obtained.

Figure 5:
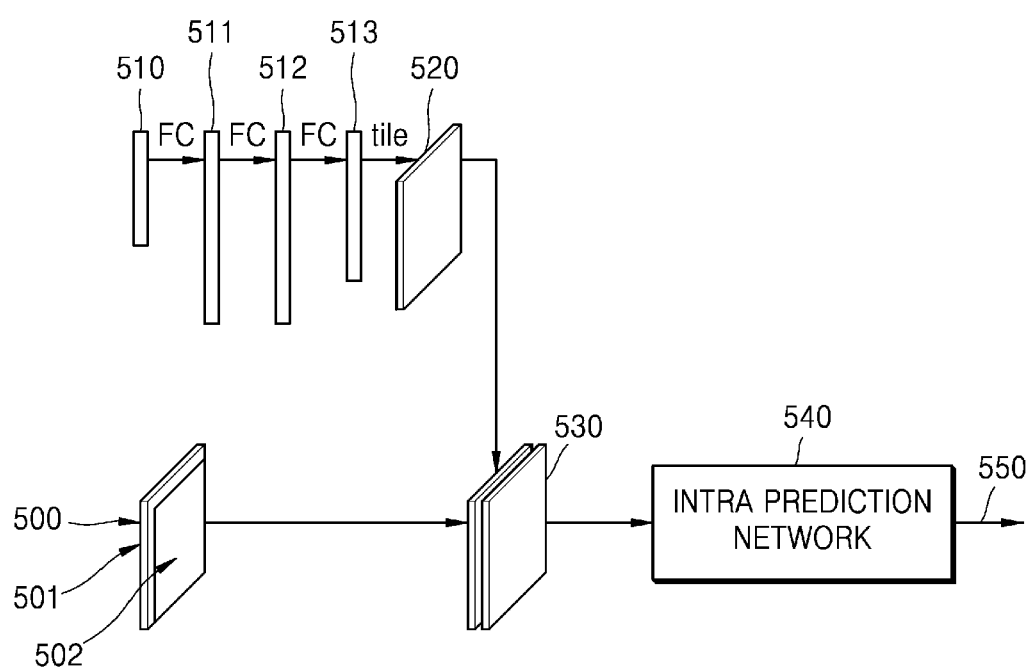
FIG. 5 is a diagram illustrating a process of fusing input data input to an intra prediction network according to another embodiment of the disclosure.

FIG. 5 is a diagram illustrating a process of fusing input data input to an intra prediction network according to another embodiment of the disclosure.

Referring to FIG. 5, merge input data 530 with respect to an intra prediction network 540 is generated by fusing intra prediction target pixels 500 and encoding information 510 with respect to the intra prediction target pixels 500. The intra prediction target pixels 500 include available and decoded neighboring pixels 501 and pixels 502 of a current block set to a zero value which is an intra prediction target. The encoding information 510 may include quantization parameters of neighboring blocks, a quantization parameter of the current block, coding unit modes (intra mode, inter mode, etc.) of neighboring blocks, a size of the current block or coding unit, a size of a neighboring block or coding unit, etc.

Similarly to FIG. 3, in FIG. 5, a neural network including a plurality of fully-connected layers is used before merging the encoding information 510 to the intra prediction target pixels 500. Specifically, the encoding information 510 is input to a first set of fully-connected layers FC so that a first intermediate feature map 511 is obtained, the first intermediate feature map 511 is input to a second set of fully-connected layers FC so that a second intermediate feature map 512 is obtained, and the second intermediate feature map 512 is input to a third set of fully-connected layer FC so that a third intermediate feature map 513 is obtained. Values of the third intermediate feature map 513 are tiled, that is, rearranged, to the same size as the intra prediction target pixels 500, and thus encoding information data 520 of the same domain as that of the intra prediction target pixels 500 is obtained. The intra prediction target pixels 500 and the encoding information data 520 are merged to obtain merged input data 530, and thus input fusion is completed.

The merged input data 530 is input to an intra prediction network 540 for intra prediction, and thus intra prediction pixels 550 are obtained.

Figure 6:
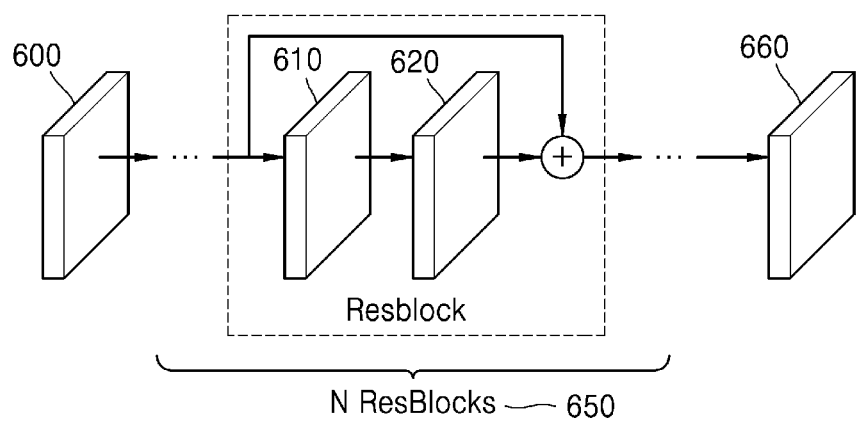
FIG. 6 is a diagram illustrating a neural network that outputs input data as a feature map according to an embodiment of the disclosure.

FIG. 6 is a diagram illustrating a neural network that outputs input data as a feature map according to an embodiment of the disclosure.

Referring to FIG. 6, a neural network 650 for extracting features of input data 600 and obtaining a feature map includes a plurality of convolutional layers.

The input data 600 is input to the neural network 650 including a plurality of residual blocks ResBlock. The residual block ResBlock means a convolution operation of a skip-connection structure that obtains a first intermediate feature map 610 by inputting the input data 600 into a first convolutional layer, obtains a second intermediate feature map 620 by inputting the first intermediate feature map 620 into a second convolutional layer, and obtains an output by adding the second intermediate feature map 620 and the input data 600.

A feature map 660 of the input data 600 is obtained by inputting the input data 600 into the neural network 650 including the plurality of residual blocks ResBlock.

Figure 7:
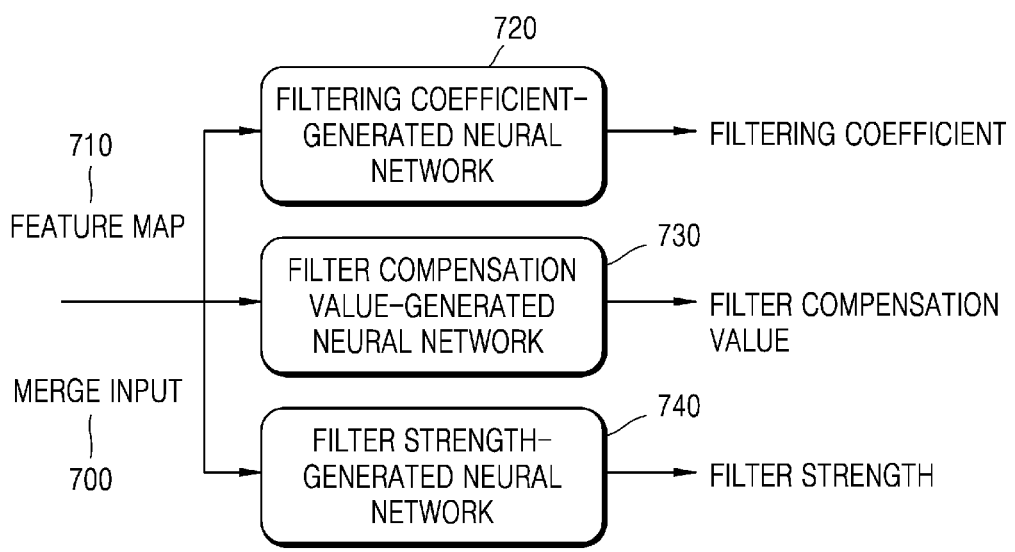
FIG. 7 is a diagram illustrating a method of obtaining a filtering coefficient, a filter compensation value, and a filter strength through each neural network based on merge input data and a feature map, according to an embodiment of the disclosure.

FIG. 7 is a diagram illustrating a method of obtaining a filtering coefficient, a filter compensation value, and a filter strength through each neural network based on merge input data and a feature map, according to an embodiment of the disclosure.

Referring to FIG. 7, in order to generate the filtering coefficient, the filter compensation value, and the filter strength for deblocking filtering, a merge input 700 obtained by merging a deblocking filter target pixel and encoding information and a feature map 710 obtained by extracting features of the merge input 700 are used. Specifically, the filtering coefficient is obtained as an output of a filtering coefficient-generated neural network 720 using the feature map 710 as an input, the filter compensation value is obtained as an output of a filter compensation value-generated neural network 730 using the feature map 710 as the input, and the filter strength is obtained as an output of a filter strength-generated neural network 740 using the merge input 700 as an input.

A plurality of neural networks are used for generating a plurality of pieces of necessary filtering information. The filtering coefficient-generated neural network 720 is used to transform a decoded pixel into a filtered pixel or a filtered residual pixel, and the filter compensation value-generated neural network 730 is used to compensate for filtering when a filtering result according to the filtering coefficient is not good, and the filter strength-generated neural network 740 is used to flexibly apply different filter strengths to neighboring blocks with different errors, depending on different predictions, transforms, and quantizations.

The filtering coefficient-generated neural network 720 and the filter compensation value-generated neural network 730 are used to apply a filter that combines an adaptive linear filter and a neural-generated pixel value instead of directly generating pixel values like other neural networks.

In the filter strength-generated neural network 740, different filter strengths are applied to both sides of a boundary so that a strong filter is used for a more error side, and a weak filter is used for a less error side. That is, the strong filter or the weak filter is implemented by scaling learned by a network.

The deblocking filters of FIGS. 8 to 15, which will be described below, are largely divided into two types: a "pixel filter" and a "residual filter". The "pixel filter" is a filter in which a result of using at least one of the filtering coefficient, the filter compensation value, or the filter strength is a filtering pixel, and the "residual filter" is a filter in which a filtering pixel is obtained by adding the filtering target pixel again because the result of using at least one of the filtering coefficient, the filter compensation value, or the filter strength is a residual filtering pixel.

Figure 8:
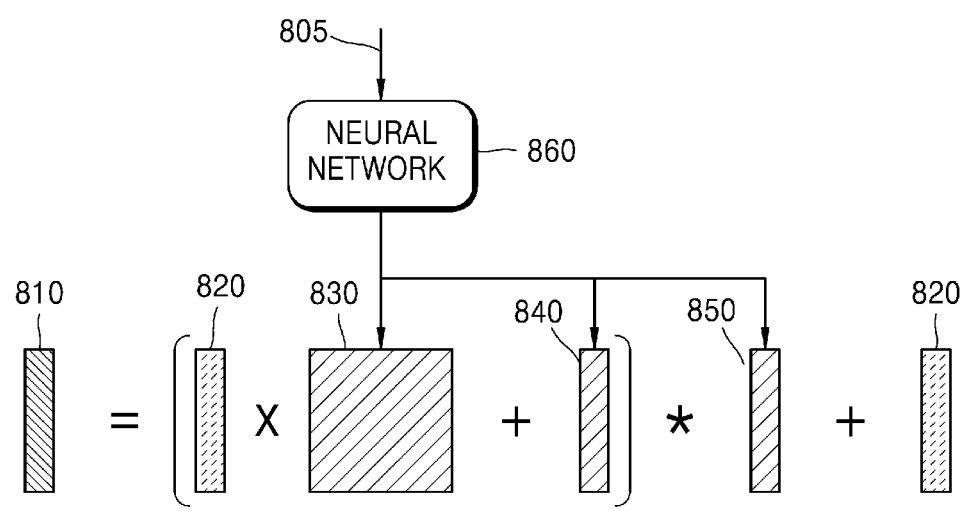
FIG. 8 is a diagram illustrating a process of obtaining a filtered pixel line using neural network-based deblocking filtering according to an embodiment of the disclosure.

FIG. 8 is a diagram illustrating a process of obtaining a filtered pixel line using neural network-based deblocking filtering according to an embodiment of the disclosure.

Referring to FIG. 8, dynamic filtering that uses deblocking filter target pixels, a filtering coefficient 830, a filter compensation value 840, and a filter strength 850 may be performed using matrix multiplication. First, the filtering coefficient 830, the filter compensation value 840, and the filter strength 850 are obtained through a neural network 860 based on one 805 of the deblocking filtering target pixels and a feature map. The neural network 860 may process a sequence of the deblocking filtering target pixels, pixel by pixel. The neural network 860 may generate a set of filter parameters (e.g., the filtering coefficient 830, the filter compensation value 840, and the filter strength 850) to be applied to each specific pixel based on the pixel value of the specific pixel and encoding information. The filtering coefficient 830, the filter compensation value 840, and the filter strength 850 may be set differently according to different pixel values and different encoding information. The neural network 860 includes neural networks for respectively obtaining the filtering coefficient 830, the filter compensation value 840, and the filter strength 850. Specifically, the filtering coefficient 830 and the filter compensation value 840 are determined based on the feature map, and the filter strength 850 is determined based on the deblocking filtering target pixels.

A linear operation of matrix multiplication is performed on a deblocking filtering target pixel line 820 and the filtering coefficient 830. A residual filtering pixel line is obtained by adding the filter compensation value 840 to a linear operation result, and a filtered pixel line 810 is obtained by multiplying the residual filtering pixel line by the filter strength 850 and adding the deblocking filtering target pixel line 820.

The dynamic filtering of FIG. 8 is expressed as Equation 1 below.

[Equation 1]
$$\hat{x} = (x \times W \times b) * s + x, W \in R^{N \times N}, b \in R^{N \times 1}, s \in R^{N \times 1} \text{ or } R^{2 \times 1} \text{ or } R^{1 \times 1}$$

Here, for example, x denotes an 8×1 vector of a pixel value representing a decoded pixel line that is a deblocking filtering target, W denotes an 8×8 matrix representing the filtering coefficient 830, b denotes an 8×1 vector representing the filter compensation value 840, s denotes an 8×1 vector representing the filtering strength 850, * denotes an element-wise multiplication, and $\hat{x}$ denotes the filtered pixel line 810.

Specifically, x×W denotes a residual pixel filtering value output by the linear operation of matrix multiplication, b denotes a residual pixel compensation value by the neural network when a result of the linear operation is not good, and s denotes a degree of filtering that needs to be applied to each side of a block boundary. For example, s may be 1.0 for a more error side, and s may be 0.0 for a less error side.

The filter of FIG. 8 is an example of a residual filter in which a filtering pixel is obtained by adding a filtering target pixel to a residual filtering pixel.

Figure 9:
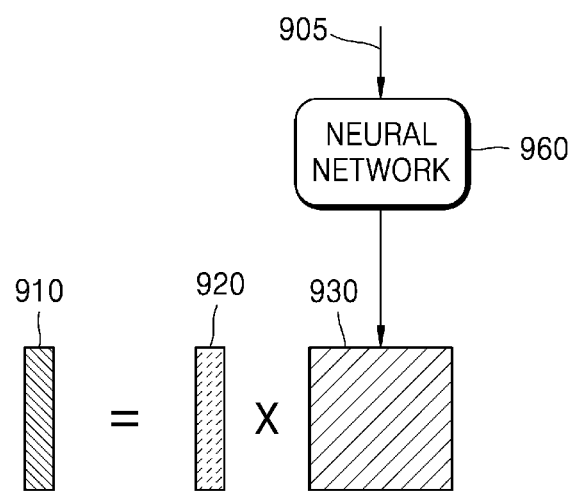
FIG. 9 is a diagram illustrating a process of obtaining a filtered pixel line using neural network-based deblocking filtering according to an embodiment of the disclosure.

FIG. 9 is a diagram illustrating a process of obtaining a filtered pixel line using neural network-based deblocking filtering according to an embodiment of the disclosure.

Referring to FIG. 9, dynamic filtering using only a filtering coefficient 930 may be performed. First, the filtering coefficient 930 is obtained through a neural network 960 based on one 905 of deblocking filtering target pixels and a feature map. Specifically, the filtering coefficient 930 is determined based on the feature map.

The neural network 960 includes a neural network for obtaining the filtering coefficient 930. A filtered pixel line 910 is obtained by performing a linear operation of matrix multiplication on a deblocking filtering target pixel line 920 and the filtering coefficient 930.

The dynamic filtering of FIG. 9 is expressed as Equation 2 below.

$$\hat{x} = x \times W, W \in R^{N \times N} \quad \text{[Equation 2]}$$

The filter of FIG. 9 is an example of a pixel filter in which a pixel filtered by a linear operation is directly output.

Figure 10:
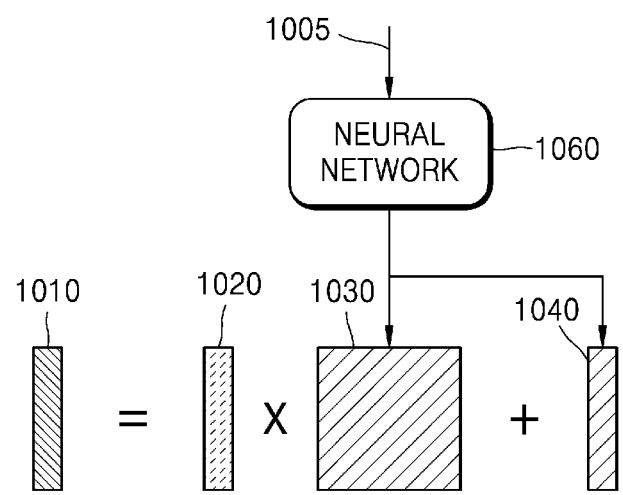
FIG. 10 is a diagram illustrating a process of obtaining a filtered pixel line using neural network-based deblocking filtering according to an embodiment of the disclosure.

FIG. 10 is a diagram illustrating a process of obtaining a filtered pixel line using neural network-based deblocking filtering according to an embodiment of the disclosure.

Referring to FIG. 10, dynamic filtering using a filtering coefficient 1030 and a filter compensation value 1040 may be performed. First, the filtering coefficient 1030 and the filter compensation value 1040 are obtained through a neural network 1060 based on one 1005 of deblocking filtering target pixels and a feature map. The neural network 1060 includes neural networks for respectively obtaining the filtering coefficient 1030 and the filter compensation value 1040. Specifically, the filtering coefficient 1030 and the filter compensation value 1040 are determined based on the feature map.

A linear operation of matrix multiplication is performed on a deblocking filtering target pixel line 1020 and the filtering coefficient 1030, and a filtered pixel line 1010 is obtained by adding the filter compensation value 1040 to a linear operation result.

The dynamic filtering of FIG. 10 is expressed as Equation 3 below.

$$\hat{x} = (x \times W + b), W \in R^{N \times N}, b \in R^{N \times 1} \quad \text{[Equation 3]}$$

The filter of FIG. 10 is an example of a pixel filter in which a filtered pixel is directly output by multiplying the filtering coefficient 1030 and adding the filter compensation value 1040.

Figure 11:
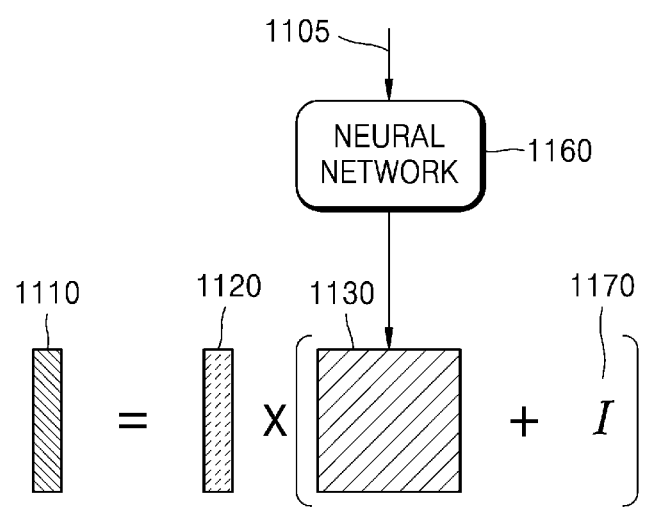
FIG. 11 is a diagram illustrating a process of obtaining a filtered pixel line using neural network-based deblocking filtering according to an embodiment of the disclosure.

FIG. 11 is a diagram illustrating a process of obtaining a filtered pixel line using neural network-based deblocking filtering according to an embodiment of the disclosure.

Referring to FIG. 11, dynamic filtering using a filtering coefficient 1130 and an identity matrix 1170 may be performed. First, the filtering coefficient 1130 is obtained through a neural network 1160 based on one 1105 of deblocking filtering target pixels and a feature map. Specifically, the filtering coefficient 1130 is determined based on the feature map.

The neural network 1160 includes a neural network for obtaining the filtering coefficient 1130. A filtered pixel line 1110 is obtained by performing a linear operation of matrix multiplication on a value obtained by adding the filtering coefficient 1130 and the identity matrix 1170 and a deblocking filtering target pixel line 1120.

The dynamic filtering of FIG. 11 is expressed as Equation 4 below.

$$\hat{x} = x \times (W + I), W \in R^{N \times N} \quad \text{[Equation 4]}$$

Here, I denotes the identity matrix 1170.

The filter of FIG. 11 is an example of a pixel filter in which a filtered pixel is directly output.

Figure 12:
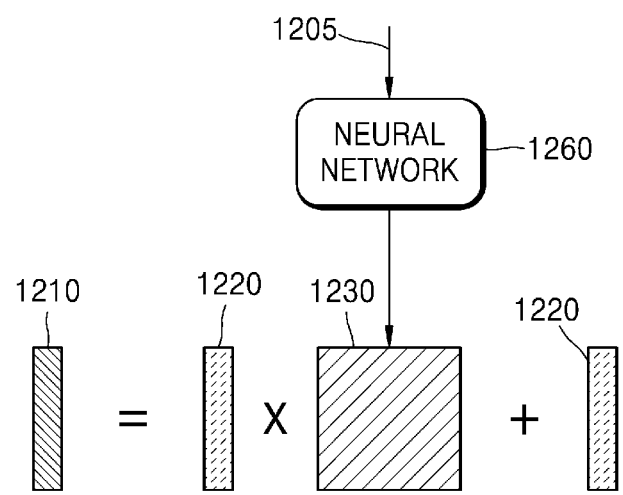
FIG. 12 is a diagram illustrating a process of obtaining a filtered pixel line using neural network-based deblocking filtering according to an embodiment of the disclosure.

FIG. 12 is a diagram illustrating a process of obtaining a filtered pixel line using neural network-based deblocking filtering according to an embodiment of the disclosure.

Referring to FIG. 12, dynamic filtering using a filtering coefficient 1230 and a deblocking filter target pixel may be performed. First, the filtering coefficient 1230 is obtained through a neural network 1260 based on one 1205 of deblocking filtering target pixels and a feature map. Specifically, the filtering coefficient 1230 is determined based on the feature map.

The neural network 1260 includes a neural network for obtaining the filtering coefficient 1230. A linear operation of matrix multiplication is performed on the filtering coefficient 1230 and a deblocking filtering target pixel line 1220, and a filtered pixel line 1210 is obtained by adding the deblocking filtering target pixel line 1220 to a linear operation result.

The dynamic filtering of FIG. 12 is expressed as Equation 5 below.

$$\hat{x} = x \times W + x, W \in R^{N \times N} \quad \text{[Equation 5]}$$

The filter of FIG. 12 is an example of a residual filter in which a filtering pixel is obtained by adding a filtering target pixel to a residual filtering pixel.

Figure 13:
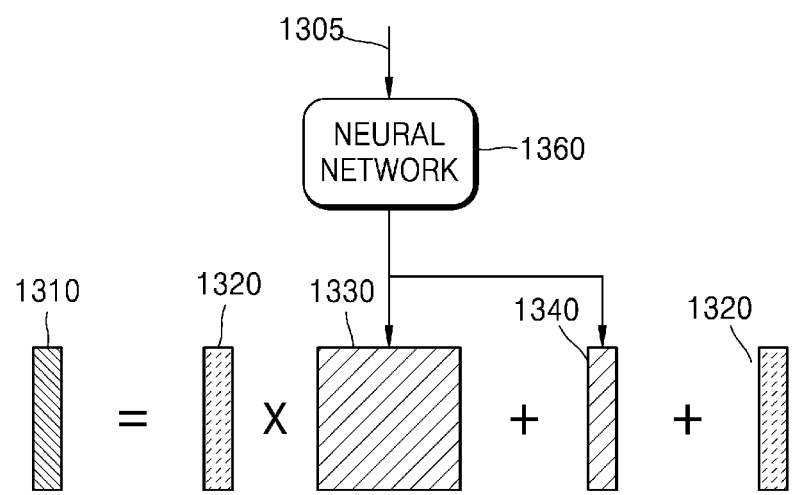
FIG. 13 is a diagram illustrating a process of obtaining a filtered pixel line using neural network-based deblocking filtering according to an embodiment of the disclosure.

FIG. 13 is a diagram illustrating a process of obtaining a filtered pixel line using neural network-based deblocking filtering according to an embodiment of the disclosure.

Referring to FIG. 13, dynamic filtering that uses a deblocking filtering target pixel, a filtering coefficient 1330, and a filter compensation value 1340 may be performed. First, the filtering coefficient 1330 and the filter compensation value 1340 are obtained through a neural network 1360 based on one 1305 of deblocking filtering target pixels and a feature map. The neural network 1360 includes neural networks for respectively obtaining the filtering coefficient 1330 and the filter compensation value 1340. Specifically, the filtering coefficient 1330 and the filter compensation value 1340 are determined based on the feature map.

A linear operation of matrix multiplication is performed on a deblocking filtering target pixel line 1320 and the filtering coefficient 1330. A residual filtering pixel line is obtained by adding the filter compensation value 1340 to a linear operation result, and a filtered pixel line 1310 is obtained by adding the deblocking filtering target pixel line 1320 to the residual filtering pixel line again.

The dynamic filtering of FIG. 13 is expressed as Equation 6 below.

$$\hat{x} = (x \times W + b) + x, W \in R^{N \times N}, b \in R^{N \times 1} \quad \text{[Equation 2]}$$

The filter of FIG. 13 is an example of a residual filter in which a filtering pixel is obtained by adding a filtering target pixel to a residual filtering pixel.

Figure 14:
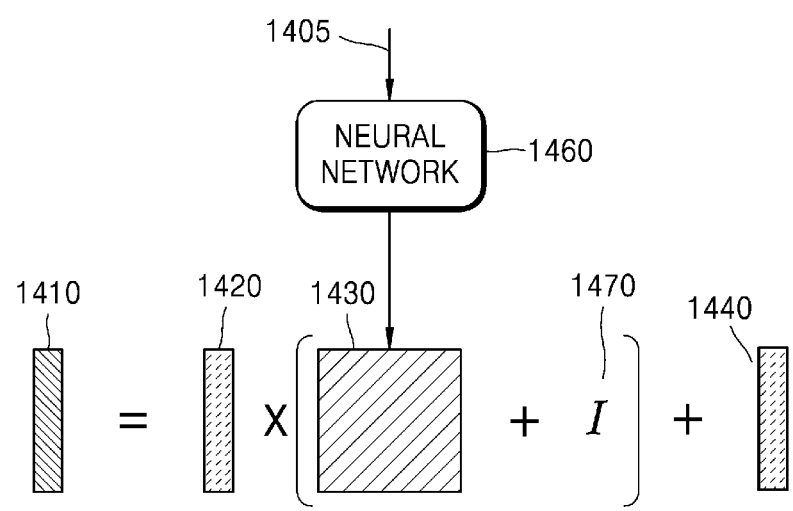
FIG. 14 is a diagram illustrating a process of obtaining a filtered pixel line using neural network-based deblocking filtering according to an embodiment of the disclosure.

FIG. 14 is a diagram illustrating a process of obtaining a filtered pixel line using neural network-based deblocking filtering according to an embodiment of the disclosure.

Referring to FIG. 14, dynamic filtering that uses a deblocking filtering target pixel, a filtering coefficient 1430, a filter compensation value 1440, and an identity matrix 1470 may be performed. First, the filtering coefficient 1430 and the filter compensation value 1440 are obtained through a neural network 1460 based on one 1405 of deblocking filtering target pixels and a feature map. The neural network 1460 includes neural networks for respectively obtaining the filtering coefficient 1430 and the filter compensation value 1440. Specifically, the filtering coefficient 1430 and the filter compensation value 1440 are determined based on the feature map.

A linear operation of matrix multiplication is performed on a value obtained by adding a filtering coefficient 1430 and the identity matrix 1470 and a deblocking filter target pixel line 1420, and a filtered pixel line 1410 is obtained by adding the filter compensation value 1440 to a linear operation result.

The dynamic filtering of FIG. 14 is expressed as Equation 7 below.

$$\hat{x} = x \times (W + I) + b, W \in R^{N \times N}, b \in R^{N \times 1} \quad \text{[Equation 7]}$$

The filter of FIG. 14 is an example of a pixel filter in which a filtered pixel is directly output.

The dynamic filtering of FIGS. 8 to 14 may be determined by switching neural networks including a plurality of convolutional layers to match an encoding configuration for better performance.

For example, neural networks for respectively determining the filtering coefficient, filter compensation value, and the filtering strength may be trained under different encoding conditions, and in a filtering test, filtering target pixels may be filtered by loading corresponding neural network parameters (weights and biases) based on the encoding conditions. Accordingly, neural networks having different neural network parameters with respect to different ranges of quantization parameters may be used, or different neural networks having different neural network parameters with respect to different temporal layers (intra, inter) may be used.

Meanwhile, when performance is tested based on a trained parameter, a difference between performance during training and performance during testing may occur. Such a difference is referred to as a "generalization gap."

The generalization gap between training and testing may lead to degradation in intra/inter frames. A lower temporal layer is more referenced in encoding. For example, an intra frame may be referenced up to 3 times with respect to GOP 4. Because pixels that are referenced multiple times should not be modified much, a scaling factor applied differently to different temporal layers may be used, as will be described below with reference to FIG. 15.

Figure 15:
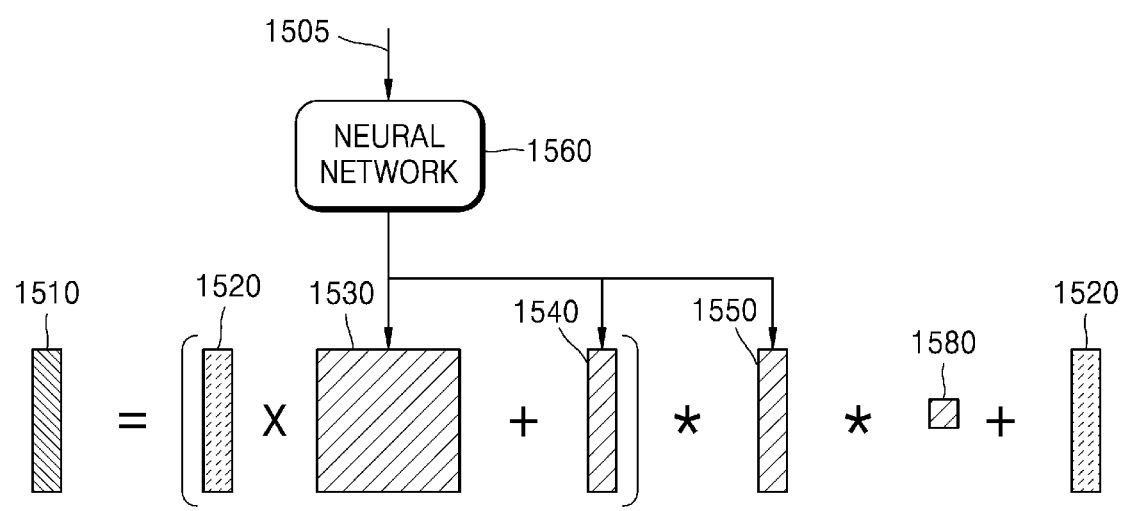
FIG. 15 is a diagram illustrating a process of obtaining a filtered pixel line using neural network-based deblocking filtering according to an embodiment of the disclosure.

FIG. 15 is a diagram illustrating a process of obtaining a filtered pixel line using neural network-based deblocking filtering according to an embodiment of the disclosure.

Referring to FIG. 15, dynamic filtering that uses deblocking filter target pixels, a filtering coefficient 1530, a filter compensation value 1540, a filter strength 1550, and a scaling factor 1580 may be performed using a matrix multiplication. First, the filtering coefficient 1530, the filter compensation value 1540, and the filter strength 1550 are obtained through a neural network 1560 based on one 1505 of deblocking filtering target pixels and a feature map. The neural network 1560 includes neural networks for respectively obtaining the filtering coefficient 1530, the filter compensation value 1540, and the filter strength 1550. A linear operation of matrix multiplication is performed on a deblocking filtering target pixel line 1520 and the filtering coefficient 1530, the filter strength 1550 is multiplied to a result obtained by adding the filter compensation value 1540 to a linear operation result, and then the scaling factor 1580 is multiplied again to the result, and thus a residual filtering pixel line is obtained. A filtered pixel line 1510 is obtained by adding the deblocking filtering target pixel line 1520 to a residual filtering pixel line.

The dynamic filtering of FIG. 15 is expressed as Equation 8 below.

$$\hat{x} = (x \times W + b) * s * S_{TL} + x, W \in R^{N \times N}, b \in R^{N \times 1}, s \in R^{N \times 1} \text{ or } R^{2 \times 1} \text{ or } R^{1 \times 1}$$ [Equation 8]

Here, for example, x denotes an 8×1 vector of a pixel value representing a decoded pixel line that is a deblocking filtering target, W denotes an 8×8 matrix representing the filtering coefficient 1530, b denotes an 8×1 vector representing the filter compensation value 1540, s denotes an 8×1 vector representing the filtering strength 1550, * denotes an element-wise multiplication, $S_{TL}$ denotes the scaling factor 1580 determined according to different temporal layers, and $\hat{x}$ denotes the filtered pixel line 1510.

The scaling factor $S_{TL}$ is set smaller with respect to a frame of a lower temporal layer. For example, the scaling factor $S_{TL}$ may be determined as 0.5 with respect to an intra frame and may be determined as 1 with respect to other frames.

The filter of FIG. 15 is an example of a residual filter in which a filtering pixel is obtained by adding a filtering target pixel to a residual filtering pixel.

FIGS. 16 to 33, which will be described below, are diagrams illustrating various embodiments of the disclosure in a structure of neural network-based deblocking filtering, but the structure of neural network-based deblocking filtering is not limited thereto.

Figure 16:
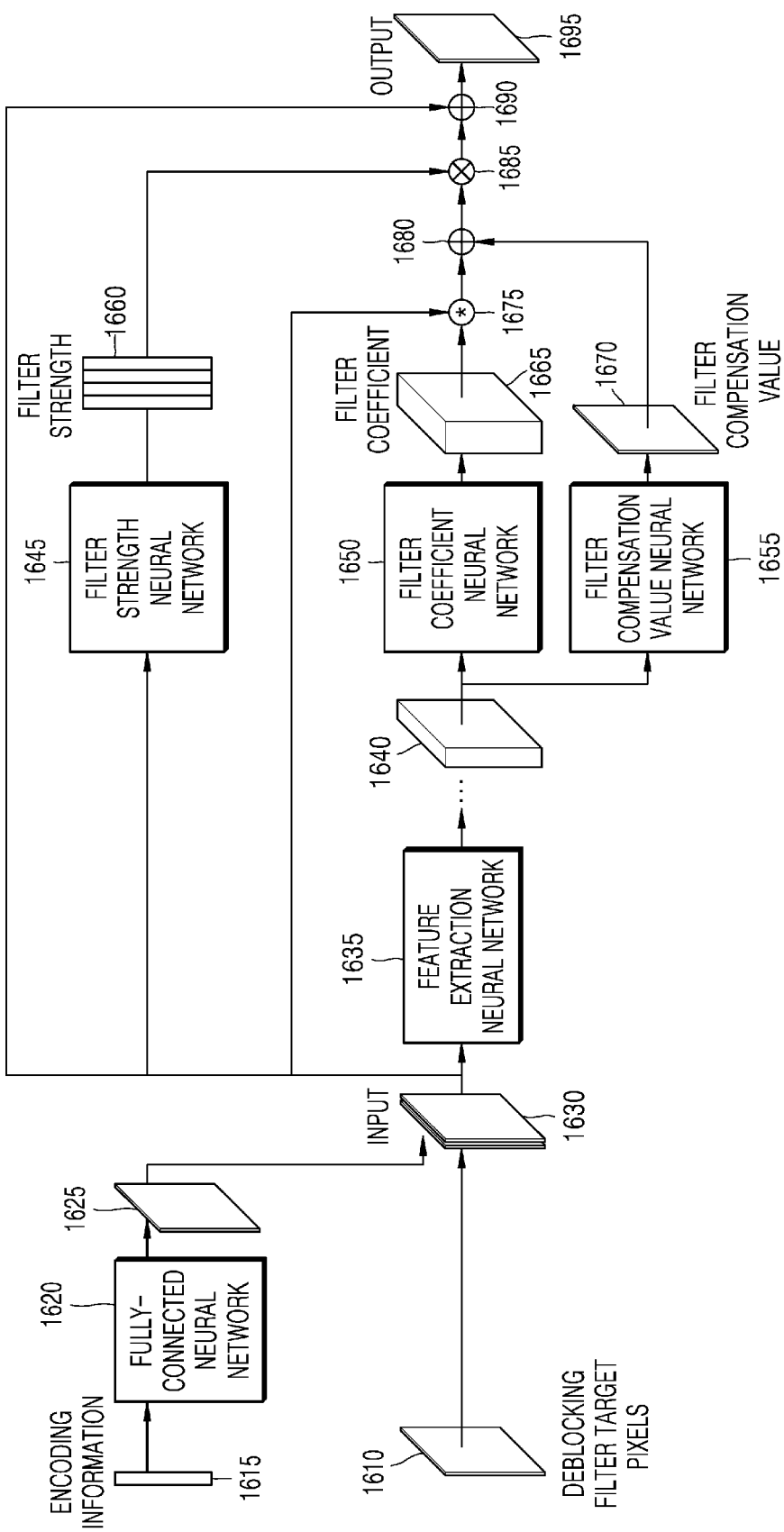
FIG. 16 is a diagram illustrating a schematic structure of neural network-based deblocking filtering according to an embodiment of the disclosure.

FIG. 16 is a diagram illustrating a schematic structure of neural network-based deblocking filtering according to an embodiment of the disclosure.

Referring to FIG. 16, encoding information input data 1625 is obtained by transforming a result of outputting encoding information 1615 of deblocking filter target pixels 1610 through a fully-connected neural network 1620 including a plurality of fully-connected layers into the same size as those of the deblocking filter target pixels 1610. Merge input data 1630 that is a result of input fusion is obtained by merging the deblocking filtering target pixels 1610 and the encoding information input data 1625.

A feature map 1640 is obtained through a feature extraction neural network 1635 using the merge input data 1630 as an input. A filter coefficient 1665 is obtained through the filter coefficient neural network 1650 using a feature map 1640 as an input, and a filter compensation value 1670 is obtained through a filter compensation value neural network 1655 using the feature map 1640 as the input.

In addition, a filter strength 1660 is obtained through a filter strength neural network 1645 using the merge input data 1630 as an input.

A linear operation result is obtained by performing a linear operation 1675 on the deblocking filter target pixels 1610 and the filter coefficient 1665, a filter compensation value 1670 is added 1680 to the linear operation result, residual filtering pixels are obtained by performing an elementwise product 1685 on the filter strength 1660 to a value obtained by adding the filter compensation value 1670, and filtered pixels 1695 are output by adding 1690 the filtering target pixels 1610 again to the residual filtering pixels.

The neural network-based deblocking filtering of FIG. 16 generates a filtering coefficient set with respect to one pixel line of filtering performed by linear matrix multiplication instead of several handcrafted filter coefficients of filters, when a linear filter set with the generated filter coefficient does not work properly, that is, when a result is not good, generates a filter compensation value for compensating for a filtering result, and generates and uses a filter strength that adaptively applies part of filtering in order to filter different encoding errors of blocks near a current boundary. In addition, the performance of filtering is improved by using not only a decoded pixel value but also encoding information. Because the pixel value and the encoding information have different modalities, the encoding information is processed with the plurality of fully-connected layers before merging into the pixel value. Such input fusion may also be used in other methods such as in-loop filters and intra prediction, as described above with reference to FIGS. 4 and 5.

To generate the filtered pixel value, other methods using a linear filter coefficient, filter compensation, and filter strength are applied. For example, the filtered pixel value may be generated directly, and a filtered residual pixel value may be generated.

Also, different previously trained models may be selected with respect to different encoding conditions for better encoding efficiency.

Also, a different scaling factor may be used for a different temporal layer that applies part of a filtering output of the decoded pixel.

Figure 17:
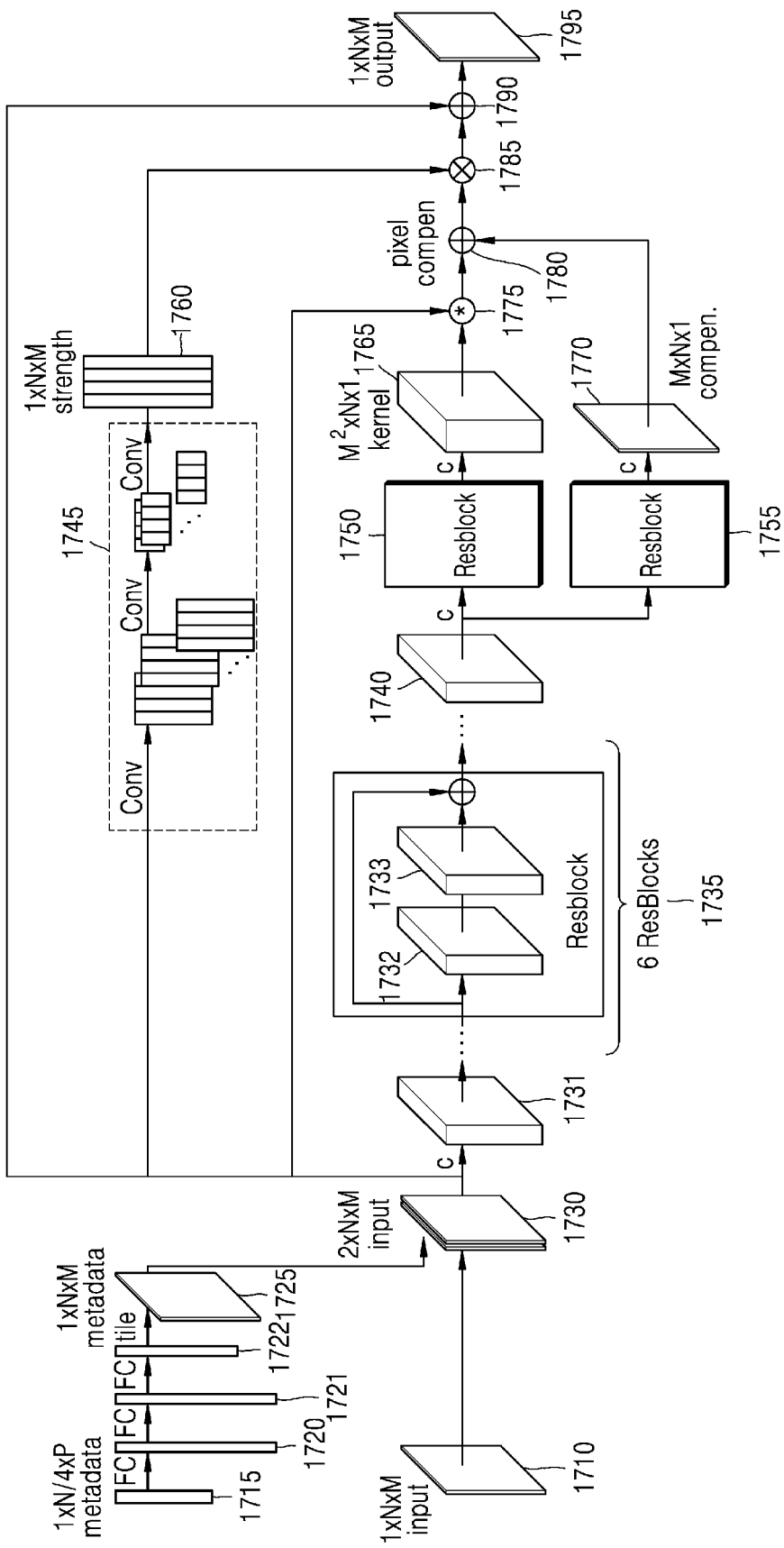
FIG. 17 is a diagram illustrating a structure of neural network-based deblocking filtering according to an embodiment of the disclosure.

FIG. 17 is a diagram illustrating a structure of neural network-based deblocking filtering according to an embodiment of the disclosure.

Referring to FIG. 17, the size of deblocking filter target pixel lines is 1×N×M, which means N lines each including M pixels. In addition, encoding information is metadata of 1×N/4×P, which means N/4 encoding information sets and P pieces of encoding information with respect to each four lines.

The encoding information may include a quantization parameter of a neighboring coding unit, a quantization parameter of a current coding unit, an encoding mode (intra/inter) of the neighboring coding unit, an encoding mode (intra/inter) of the current coding unit, etc.

A metadata 1715 of the encoding information is input to a first set of fully-connected layers FC and output as a first intermediate feature map 1720. The first intermediate feature map 1720 is input to a second set of fully-connected layers FC and output as a second intermediate feature map 1721. The second intermediate feature map 1721 is input to a third set of fully-connected layers FC and output as a third intermediate feature map 1722. The third intermediate feature map 1722 is tiled by rearranging the third intermediate feature map 1722 to have the same as those of deblocking filtering target pixel lines 1710, and thus a metadata input 1725 of 1×N×M having the same size as those of the deblocking filtering target pixel lines 1710 is obtained.

A merge input 1730 of 2×N×M is obtained by concatenating the deblocking filtering target pixel lines 1710 of 1×N×M and the metadata input 1725 of 1×N×M.

A first feature map 1731 is obtained by performing a convolution operation C on the merge input 1730, and a feature map 1740 with respect to the merge input 1730 is consequently extracted by performing a residual block operation 1735 on the first feature map 1731 six times. The residual block operation 1735 is, for example, a convolution operation of a skip-connection structure that obtains an output by adding input data again to the second intermediate feature map 1733 obtained by performing the convolution operation C again on the first intermediate feature map 1732 obtained by performing the convolution operation C on the input data.

A deblocking filtering coefficient 1765 of a $M^2 \times N \times 1$ kernel is obtained by performing the convolution operation C, a residual block operation 1750, and the convolution operation C on the feature map 1740 of the merge input 1730, and a deblocking filtering compensation value 1770 of M×N×1 is obtained by performing a residual block operation 1755 and the convolution operation C on the feature map 1740 of the merge input 1730. Here, the convolution operation C, the residual block operation 1750, and the convolution operation C correspond to a filter coefficient neural network, and the residual block operation 1755 and the convolution operation C correspond to a filtering compensation value neural network. Also, a filtering strength 1760 of 1×N×M is obtained through a filter strength neural network 1745 including a plurality of convolution operations C on the merge input 1730.

As described above, neural network-based deblocking filtering is performed using deblocking filtering coefficient 1765, the deblocking filtering compensation value 1770, the filtering strength 1760 obtained based on the neural network, and the deblocking filtering target pixel lines 1710 among the merge input 1730.

Specifically, a linear operation 1775 of matrix multiplication is performed using the deblocking filtering target pixel lines 1710 and the deblocking filtering coefficient 1765, the deblocking filtering compensation value 1770 is added 1780 to a result of the linear operation 1775, residual filtering pixel lines are obtained by performing an element-wise product 1785 on a result of adding the deblocking filtering compensation value 1770 using the filtering strength 1760, and deblocking filtering pixel lines 1795 of 1×N×M are obtained by adding 1790 the deblocking filtered target pixel lines 1710 again on the residual filtering pixel lines.

Figure 18:
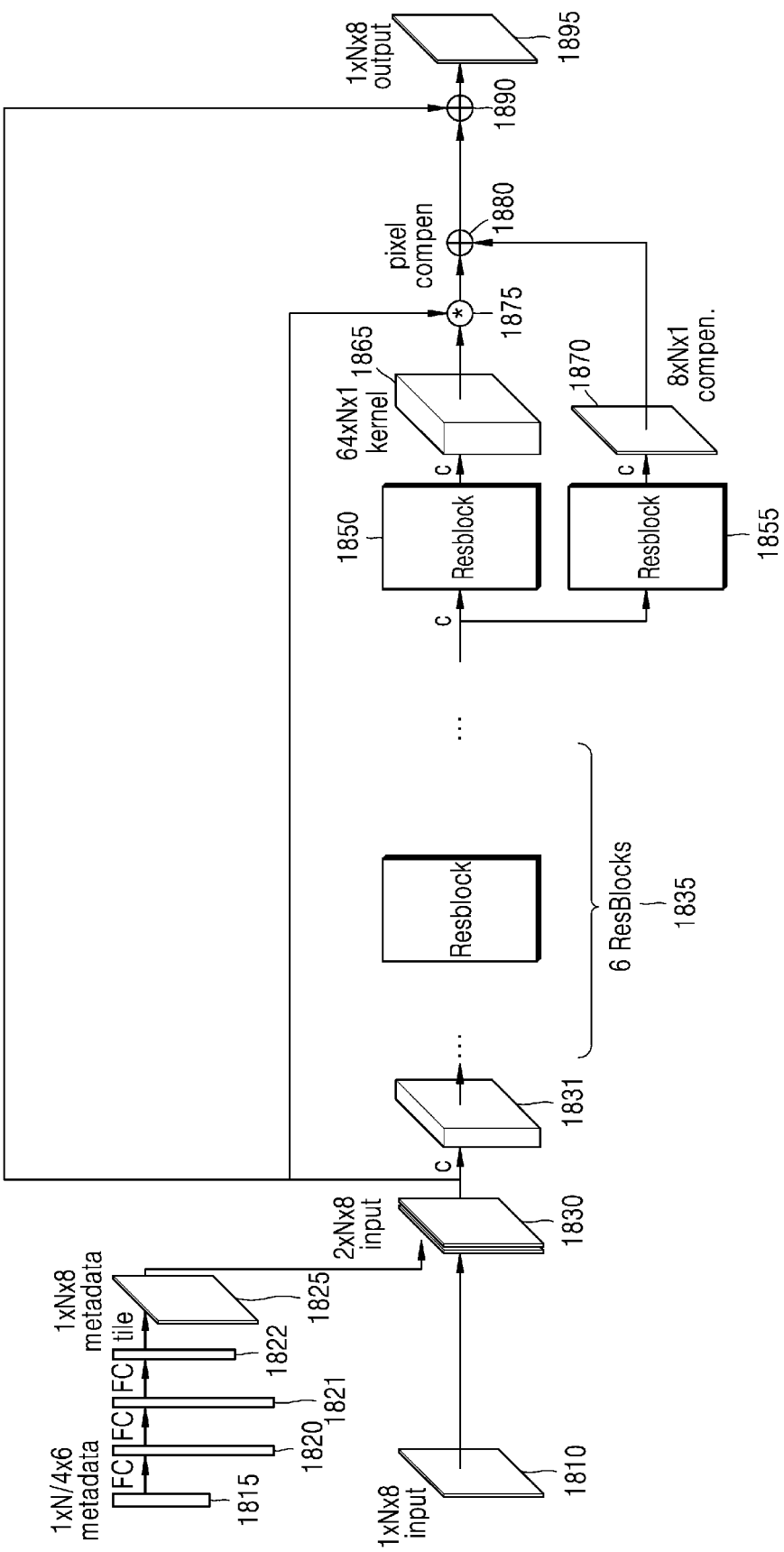
FIG. 18 is a diagram illustrating a structure of neural network-based deblocking filtering according to an embodiment of the disclosure.

FIG. 18 is a diagram illustrating a structure of neural network-based deblocking filtering according to an embodiment of the disclosure.

Referring to FIG. 18, the size of deblocking filter target pixel lines is 1×N×8, which means N lines each including 8 pixels. In addition, encoding information is metadata of 1×N/4×6, which means N/4 encoding information sets and 6 pieces of encoding information with respect to each four lines.

The encoding information may include a quantization parameter of a neighboring coding unit, a quantization parameter of a current coding unit, an encoding mode (intra/inter) of the neighboring coding unit, an encoding mode (intra/inter) of the current coding unit, etc.

A metadata 1815 of the encoding information is input to a first set of fully-connected layers FC and output as a first intermediate feature map 1820. The first intermediate feature map 1820 is input to a second set of fully-connected layers FC and output as a second intermediate feature map 1821. The second intermediate feature map 1821 is input to a third set of fully-connected layers FC and output as a third intermediate feature map 1822. The third intermediate feature map 1822 is tiled by rearranging the third intermediate feature map 1822 to have the same as those of deblocking filtering target pixel lines 1810, and thus a metadata input 1825 of 1×N×8 having the same size as those of the deblocking filtering target pixel lines 1810 is obtained.

A merge input 1830 of 2×N×8 is obtained by concatenating the deblocking filtering target pixel lines 1810 of 1×N×8 and the metadata input 1825 of 1×N×8.

A first feature map 1831 is obtained by performing the convolution operation C on the merge input 1830, and a feature map with respect to the merge input 1830 is consequently extracted by performing a residual block operation 1835 on the first feature map 1831 six times.

A deblocking filtering coefficient 1865 of a 64×N×1 kernel is obtained by performing the convolution operation C, a residual block operation 1850, and the convolution operation C on the feature map of the merge input 1830, and a deblocking filtering compensation value 1870 of 8×N×1 is obtained by performing a residual block operation 1855 and the convolution operation C on the feature map of the merge input 1830. Here, the convolution operation C, the residual block operation 1850, and the convolution operation C correspond to a filter coefficient neural network, and the residual block operation 1855 and the convolution operation C correspond to a filtering compensation value neural network.

As described above, neural network-based deblocking filtering is performed using the deblocking filtering coefficient 1865, the deblocking filtering compensation value 1870 obtained based on the neural network, and the deblocking filtering target pixel lines 1810 among the merge input 1830.

Specifically, a linear operation 1875 of matrix multiplication is performed using the deblocking filtering target pixel lines 1810 and the deblocking filtering coefficient 1865, residual filtering pixel lines are obtained by adding 1880 the deblocking filtering compensation value 1870 to a result of the linear operation 1875, and deblocking filtering pixel lines 1895 of 1×N×8 are obtained by adding 1890 the deblocking filtered target pixel lines 1810 again on the residual filtering pixel lines.

Figure 19:
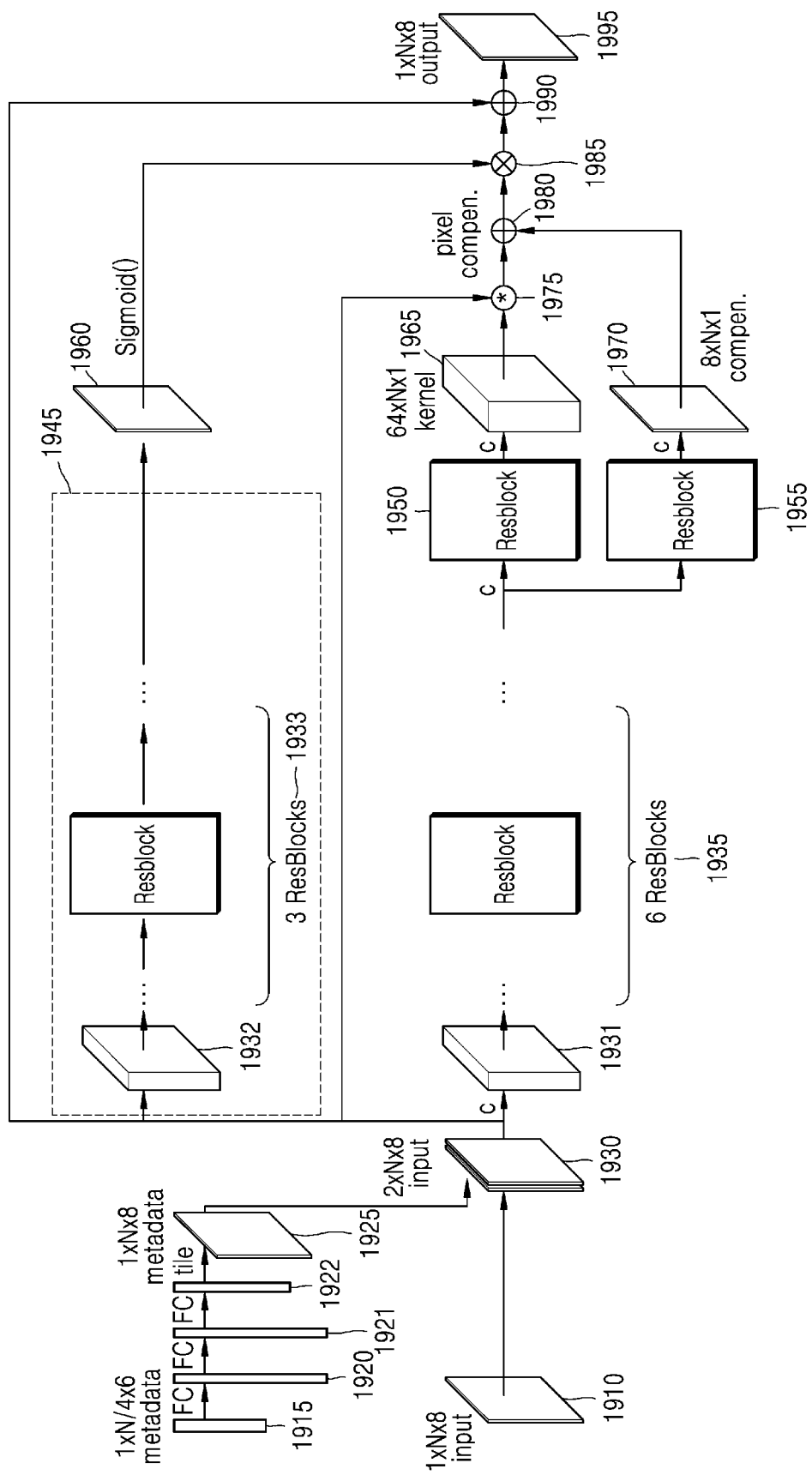
FIG. 19 is a diagram illustrating a structure of neural network-based deblocking filtering according to an embodiment of the disclosure.

FIG. 19 is a diagram illustrating a structure of neural network-based deblocking filtering according to an embodiment of the disclosure.

Referring to FIG. 19, the size of deblocking filter target pixel lines is 1×N×8, which means N lines each including 8 pixels. In addition, encoding information is metadata of 1×N/4×6, which means N/4 encoding information sets and 6 pieces of encoding information with respect to each four lines.

The encoding information may include a quantization parameter of a neighboring coding unit, a quantization parameter of a current coding unit, an encoding mode (intra/inter) of the neighboring coding unit, an encoding mode (intra/inter) of the current coding unit, a coding block flag cbf of the neighboring coding unit, the coding block flag cbf of the current coding unit, etc.

A metadata 1915 of the encoding information is input to a first set of fully-connected layers FC and output as a first intermediate feature map 1920. The first intermediate feature map 1920 is input to a second set of fully-connected layers FC and output as a second intermediate feature map 1921. The second intermediate feature map 1921 is input to a third set of fully-connected layers FC and output as a third intermediate feature map 1922. The third intermediate feature map 1922 is tiled by rearranging the third intermediate feature map 1922 to have the same size as those of deblocking filtering target pixel lines 1910, and thus a metadata input 1925 of 1×N×8 having the same size as those of the deblocking filtering target pixel lines 1910 is obtained.

A merge input 1930 of 2×N×8 is obtained by concatenating the deblocking filtering target pixel lines 1910 of 1×N×8 and the metadata input 1925 of 1×N×8.

A first feature map 1931 is obtained by performing the convolution operation C on the merge input 1930, and a feature map with respect to the merge input 1930 is consequently extracted by performing a residual block operation 1935 on the first feature map 1931 six times.

A deblocking filtering coefficient 1965 of a 64×N×1 kernel is obtained by performing the convolution operation C, a residual block operation 1950, and the convolution operation C on the feature map of the merge input 1930, and a deblocking filtering compensation value 1970 of 8×N×1 is obtained by performing a residual block operation 1955 and the convolution operation C on the feature map of the merge input 1930. Here, the convolution operation C, the residual block operation 1950, and the convolution operation C correspond to a filter coefficient neural network, and the residual block operation 1955 and the convolution operation C correspond to a filtering compensation value neural network. In addition, a filtering strength 1960 is obtained by performing the residual block operation 1933 three times on the first intermediate feature map 1932 in which the convolution operation C is performed on the merge input 1930. The convolution operation C and the residual block operation 1933 three times correspond to a filter strength neural network 1945.

As described above, neural network-based deblocking filtering is performed using the deblocking filtering coefficient 1965, the deblocking filtering compensation value 1970, the filtering strength 1960 obtained based on the neural network, and the deblocking filtering target pixel lines 1910 among the merge input 1930.

Specifically, a linear operation 1975 of matrix multiplication is performed using the deblocking filtering target pixel lines 1910 and the deblocking filtering coefficient 1965, the deblocking filtering compensation value 1970 is added 1680 to a result of the linear operation 1975, residual filtering pixel lines are obtained by performing an element-wise product 1985 on a result of adding the deblocking filtering compensation value 1970 using a result of applying a sigmoid function Sigmoid( ) to the filtering strength 1960, and deblocking filtered pixel lines 1995 of 1×N×8 are obtained by adding 1990 the deblocking filtering target pixel lines 1910 again on the residual filtering pixel lines.

Figure 20:
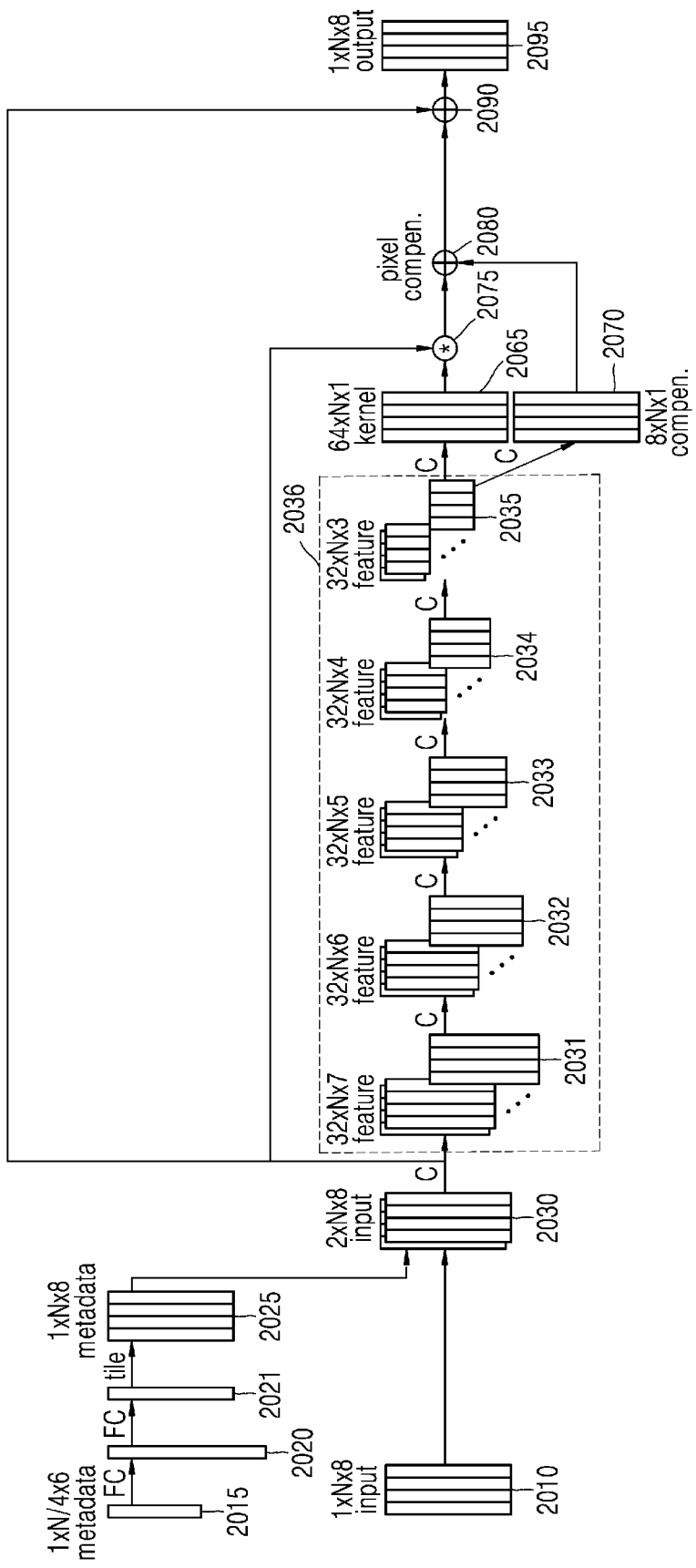
FIG. 20 is a diagram illustrating a structure of neural network-based deblocking filtering according to an embodiment of the disclosure.

FIG. 20 is a diagram illustrating a structure of neural network-based deblocking filtering according to an embodiment of the disclosure.

Referring to FIG. 20, the size of deblocking filter target pixel lines is 1×N×8, which means N lines each including 8 pixels. In addition, encoding information is metadata of 1×N/4×6, which means N/4 encoding information sets and 6 pieces of encoding information with respect to each four lines.

The encoding information may include a quantization parameter of a neighboring coding unit, a quantization parameter of a current coding unit, an encoding mode (intra/inter) of the neighboring coding unit, an encoding mode (intra/inter) of the current coding unit, the coding block flag cbf of the neighboring coding unit, the coding block flag cbf of the current coding unit, etc.

A metadata 2015 of the encoding information is input to the fully-connected layer FC and output as a first intermediate feature map 2020. The first intermediate feature map 2020 is input to the fully-connected layer FC and output as a second intermediate feature map 2021. The second intermediate feature map 2021 is tiled by rearranging the second intermediate feature map 2021 to have the same size as those of deblocking filtering target pixel lines 2010, and thus a metadata input 2025 of 1×N×8 having the same size as those of the deblocking filtering target pixel lines 2010 is obtained.

A merge input 2030 of 2×N×8 is obtained by concatenating the deblocking filtering target pixel lines 2010 of 1×N×8 and the metadata input 2025 of 1×N×8.

A first intermediate feature map 2031 of 32×N×7 is obtained by performing the convolution operation C on a merge input 2030, a second intermediate feature map 2032 is obtained by performing the convolution operation C on the first intermediate feature map 2031, a third intermediate feature map 2033 of 32×N×5 is obtained by performing the convolution operation C on the second intermediate feature map 2032, a fourth intermediate feature map 2034 of 32×N×4 is obtained by performing the convolution operation C on the third intermediate feature map 2033, and a feature map 2035 of 32×N×3 with respect to the merge input 2030 is consequently extracted by performing the convolution operation C on the fourth intermediate feature map 2034. Here, the convolution operation C five times corresponds to a feature extraction neural network 2036.

A deblocking filtering coefficient 2065 of a 64×N×1 kernel is obtained by performing the convolution operation C on the feature map 2035 of the merge input 2030, and a deblocking filtering compensation value 2070 of 8×N×1 is obtained by performing the convolution operation C on the feature map 2035 of the merge input 2030. Here, the convolution operations C respectively correspond to a filter coefficient neural network and a filtering compensation value neural network.

As described above, neural network-based deblocking filtering is performed using deblocking filtering coefficient 2065, the deblocking filtering compensation value 2070 obtained based on the neural network, and the deblocking filtering target pixel lines 2010 among the merge input 2030.

Specifically, a linear operation 2075 of matrix multiplication is performed using the deblocking filtering target pixel lines 2010 and the deblocking filtering coefficient 2065, residual filtering pixel lines are obtained by adding 2080 the deblocking filtering compensation value 2070 to a result of the linear operation 2075, and deblocking filtered pixel lines 2095 of 1×N×8 are obtained by adding 2090 the deblocking filtering target pixel lines 2010 again on the residual filtering pixel lines.

Figure 21:
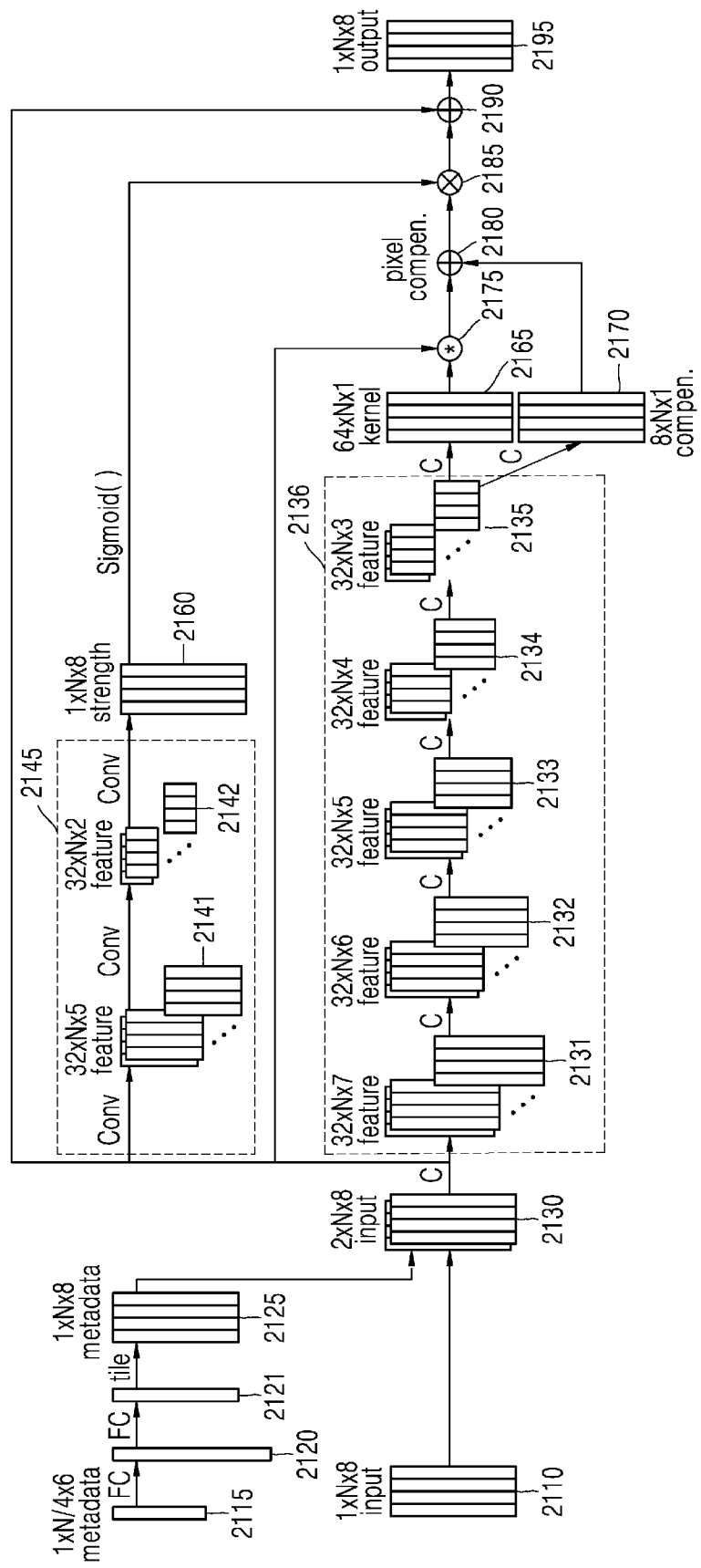
FIG. 21 is a diagram illustrating a structure of neural network-based deblocking filtering according to an embodiment of the disclosure.

FIG. 21 is a diagram illustrating a structure of neural network-based deblocking filtering according to an embodiment of the disclosure.

Referring to FIG. 21, the size of deblocking filter target pixel lines is 1×N×8, which means N lines each including 8 pixels. In addition, encoding information is metadata of 1×N/4×6, which means N/4 encoding information sets and 6 pieces of encoding information with respect to each four lines.

The encoding information may include a quantization parameter of a neighboring coding unit, a quantization parameter of a current coding unit, an encoding mode (intra/inter) of the neighboring coding unit, an encoding mode (intra/inter) of the current coding unit, the coding block flag cbf of the neighboring coding unit, the coding block flag cbf of the current coding unit, etc.

A metadata 2115 of the encoding information is input to the fully-connected layer FC and output as a first intermediate feature map 2120. The first intermediate feature map 2120 is input to the fully-connected layer FC and is output as a second intermediate feature map 2121. The second intermediate feature map 2121 is tiled by rearranging the second intermediate feature map 2121 to have the same size as those of deblocking filtering target pixel lines 2110, and thus a metadata input 2125 of 1×N×8 having the same size as those of the deblocking filtering target pixel lines 2110 is obtained.

A merge input 2130 of 2×N×8 is obtained by concatenating the deblocking filtering target pixel lines 2110 of 1×N×8 and the metadata input 2125 of 1×N×8.

A first intermediate feature map 2131 of 32×N×7 is obtained by performing the convolution operation Con a merge input 2130, a second intermediate feature map 2132 is obtained by performing the convolution operation C on the first intermediate feature map 2131, a third intermediate feature map 2133 of 32×N×5 is obtained by performing the convolution operation C on the second intermediate feature map 2132, a fourth intermediate feature map 2134 of 32×N×4 is obtained by performing the convolution operation C on the third intermediate feature map 2133, and a feature map 2135 of 32×N×3 with respect to the merge input 2130 is consequently extracted by performing the convolution operation C on the fourth intermediate feature map 2134. Here, the convolution operation C five times corresponds to a feature extraction neural network 2136.

A deblocking filtering coefficient 2165 of a 64×N×1 kernel is obtained by performing the convolution operation C on the feature map 2135 of the merge input 2130, and a deblocking filtering compensation value 2170 of 8×N×1 is obtained by performing the convolution operation C on the feature map 2135 of the merge input 2130. Here, the convolution operations C respectively correspond to a filter coefficient neural network and a filtering compensation value neural network. In addition, a first intermediate feature map 2141 of 32×N×5 is obtained by performing a convolution operation Cony on the merge input 2130, a second intermediate feature map 2142 of 32×N×2 is obtained by performing the convolution operation Cony on the first intermediate feature map 2141, and a filtering strength 2160 of 1×N×8 is obtained by performing the convolution operation Cony on the second intermediate feature map 2142. The convolution operation Cony three times corresponds to a filter strength neural network 2145.

As described above, neural network-based deblocking filtering is performed using the deblocking filtering coefficient 2165, the deblocking filtering compensation value 2170, the filtering strength 2160 obtained based on the neural network, and the deblocking filtering target pixel lines 2110 among the merge input 2130.

Specifically, a linear operation 2175 of matrix multiplication is performed using the deblocking filtering target pixel lines 2110 and the deblocking filtering coefficient 2165, the deblocking filtering compensation value 2170 is added 1680 to a result of the linear operation 2175, residual filtering pixel lines are obtained by performing an element-wise product 2185 on a result of adding the deblocking filtering compensation value 2170 using a result of applying the sigmoid function Sigmoid( ) to the filtering strength 2160, and deblocking filtered pixel lines 2195 of 1×N×8 are obtained by adding 2190 the deblocking filtering target pixel lines 2110 again on the residual filtering pixel lines.

Figure 22:
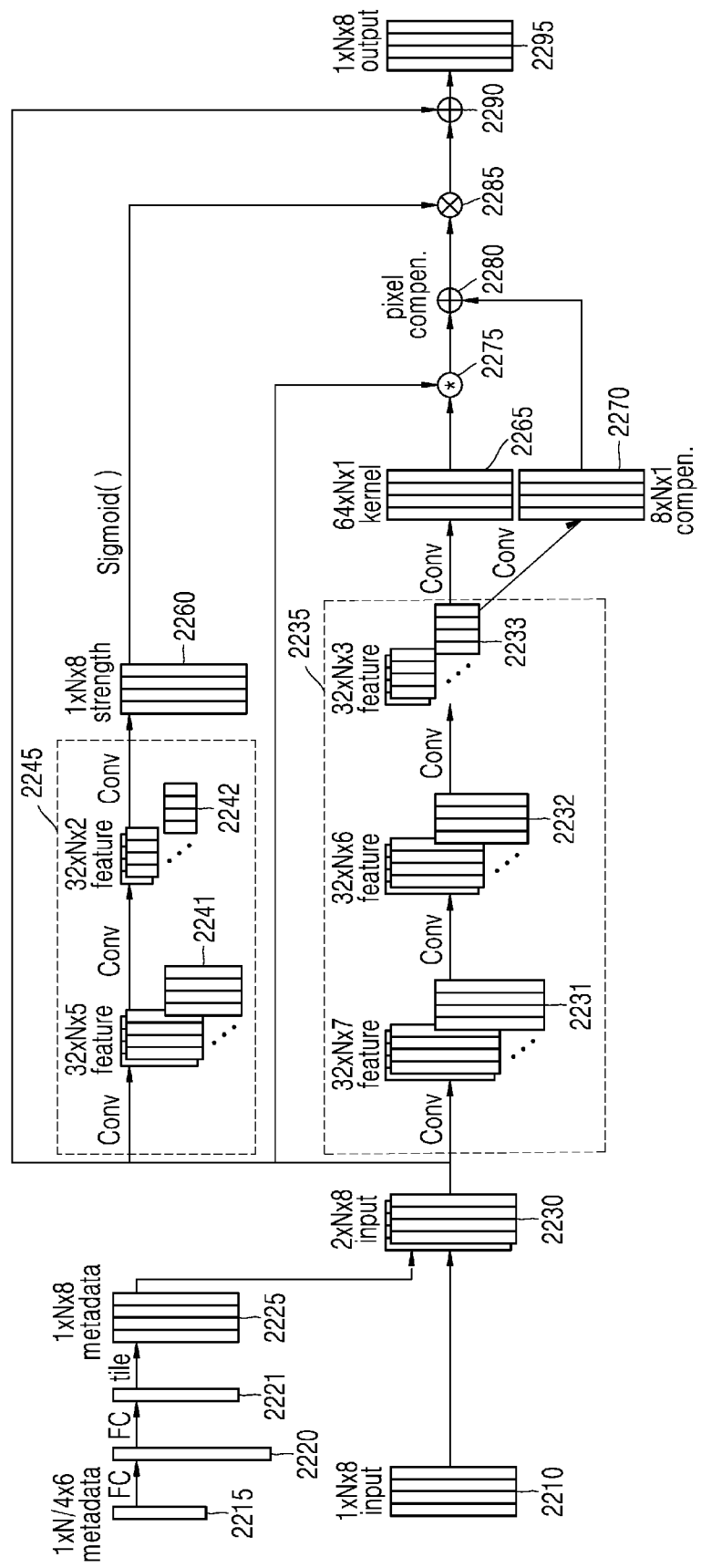
FIG. 22 is a diagram illustrating a structure of neural network-based deblocking filtering according to an embodiment of the disclosure.

FIG. 22 is a diagram illustrating a structure of neural network-based deblocking filtering according to an embodiment of the disclosure.

Referring to FIG. 22, the size of deblocking filter target pixel lines is 1×N×8, which means N lines each including 8 pixels. In addition, encoding information is metadata of 1×N/4×6, which means N/4 encoding information sets and 6 pieces of encoding information with respect to each four lines.

The encoding information may include a quantization parameter of a neighboring coding unit, a quantization parameter of a current coding unit, an encoding mode (intra/inter) of the neighboring coding unit, an encoding mode (intra/inter) of the current coding unit, the coding block flag cbf of the neighboring coding unit, the coding block flag cbf of the current coding unit, etc.

A metadata 2215 of the encoding information is input to a first set of fully-connected layers FC and output as a first intermediate feature map 2220. The first intermediate feature map 2220 is input to a second set of fully-connected layers FC and output as a second intermediate feature map 2221. The second intermediate feature map 2221 is tiled by rearranging the second intermediate feature map 2221 to have the same size as those of deblocking filtering target pixel lines 2110, and thus a metadata input 2125 of 1×N×8 having the same size as those of the deblocking filtering target pixel lines 2110 is obtained.

A merge input 2230 of 2×N×8 is obtained by concatenating the deblocking filtering target pixel lines 2210 of 1×N×8 and the metadata input 2225 of 1×N×8.

A first intermediate feature map 2231 of 32×N×7 is obtained by performing the convolution operation Conv on the merge input 2230, a second intermediate feature map 2232 is obtained by performing the convolution operation Conv on the first intermediate feature map 2231, and a feature map 2233 of 32×N×3 with respect to the merge input 2230 is consequently extracted by performing the convolution operation Conv on the second intermediate feature map 2232. The convolution operation Conv three times corresponds to a feature extraction neural network 2235.

A deblocking filtering coefficient 2265 of a 64×N×1 kernel is obtained by performing the convolution operation Conv on the feature map 2233 of the merge input 2230, and a deblocking filtering compensation value 2270 of 8×N×1 is obtained by performing the convolution operation Conv on the feature map 2233 of the merge input 2230. Here, the convolution operations Conv respectively correspond to a filter coefficient neural network and a filtering compensation value neural network. In addition, a first intermediate feature map 2241 of 32×N×5 is obtained by performing the convolution operation Conv on the merge input 2230, a second intermediate feature map 2242 of 32×N×2 is obtained by performing the convolution operation Conv on the first intermediate feature map 2241, and a filtering strength 2260 of 1×N×8 is obtained by performing the convolution operation Conv on the second intermediate feature map 2242. The convolution operation Conv three times corresponds to a filter strength neural network 2245.

As described above, neural network-based deblocking filtering is performed using the deblocking filtering coefficient 2265, the deblocking filtering compensation value 2270, the filtering strength 2260 obtained based on the neural network, and the deblocking filtering target pixel lines 2210 among the merge input 2230.

Specifically, a linear operation 2275 of matrix multiplication is performed using the deblocking filtering target pixel lines 2210 and the deblocking filtering coefficient 2265, the deblocking filtering compensation value 2270 is added 2280 to a result of the linear operation 2275, residual filtering pixel lines are obtained by performing an elementwise product 2285 on a result of adding the deblocking filtering compensation value 2270 using a result of applying the sigmoid function Sigmoid( ) to the filtering strength 2260, and deblocking filtered pixel lines 2295 of 1×N×8 are obtained by adding 2290 the deblocking filtering target pixel lines 2210 again on the residual filtering pixel lines.

Figure 23:
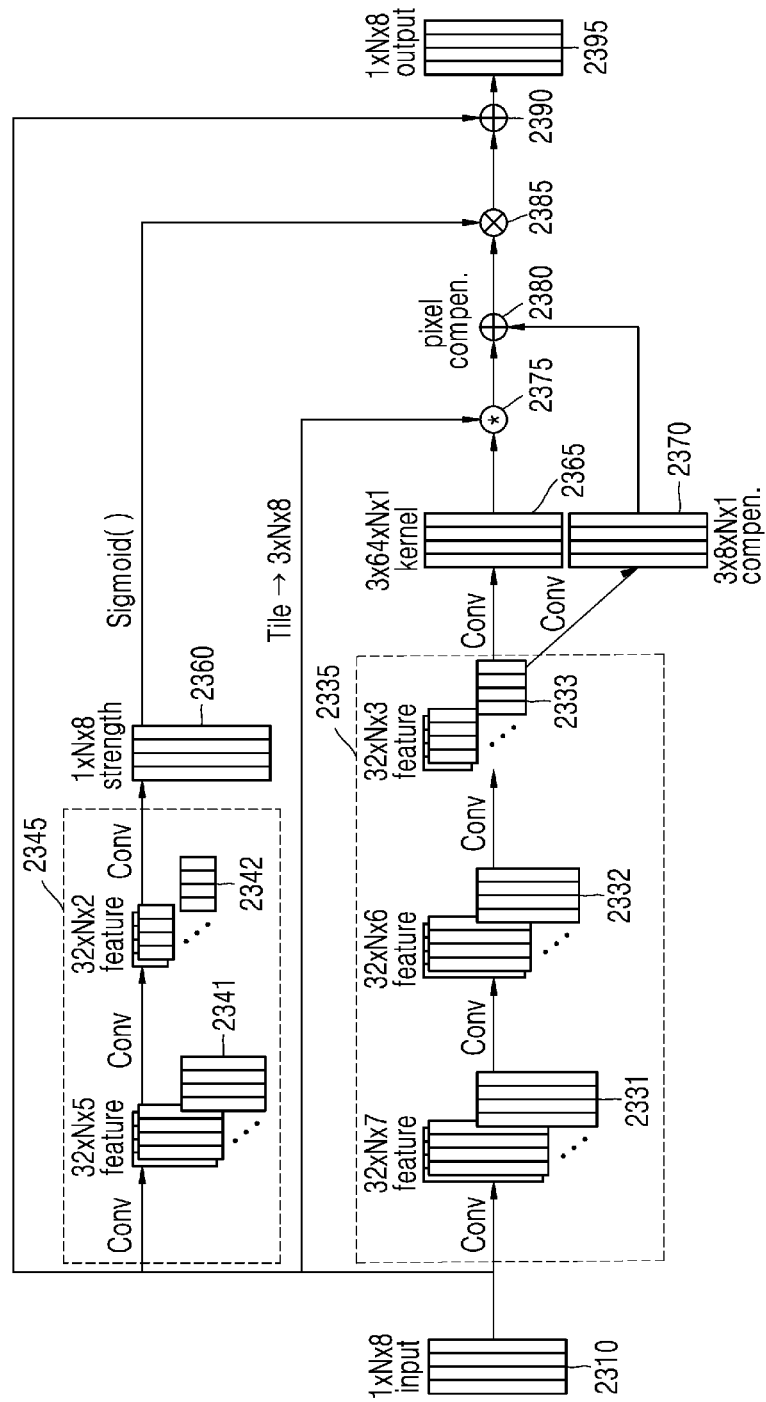
FIG. 23 is a diagram illustrating a structure of neural network-based deblocking filtering according to an embodiment of the disclosure.

FIG. 23 is a diagram illustrating a structure of neural network-based deblocking filtering according to an embodiment of the disclosure.

Referring to FIG. 23, the size of deblocking filter target pixel lines is 1×N×8, which means N lines each including 8 pixels. Metadata with respect to encoding information is not fused to an input, and only deblocking filter target pixels are used as the input.

A first intermediate feature map 2331 of 32×N×7 is obtained by performing the convolution operation Conv on deblocking filtering target pixel lines 2310, a second intermediate feature map 2332 of 32×N×6 is obtained by performing the convolution operation Conv on the first intermediate feature map 2331, and a feature map 2333 of 32×N×3 with respect to the deblocking filtering target pixel lines 2310 is consequently extracted by performing the convolution operation Conv on the second intermediate feature map 2332. Here, the convolution operation Conv three times corresponds to a feature extraction neural network 2335.

A deblocking filtering coefficient 2365 of a 3×64×N×1 kernel is obtained by performing the convolution operation Conv on a feature map 2333 of the deblocking filtering target pixel lines 2310, and a deblocking filtering compensation value 2370 of 3×8×N×1 is obtained by performing the convolution operation Conv on the feature map 2333 of the deblocking filtering target pixel lines 2310. Here, the convolution operations Conv respectively correspond to a filter coefficient neural network and a filtering compensation value neural network. In addition, a first intermediate feature map 2341 of 32×N×5 is obtained by performing the convolution operation Conv on the deblocking filtering target pixel lines 2310, a second intermediate feature map 2342 of 32×N×2 is obtained by performing the convolution operation Conv on the first intermediate feature map 2341, and a filtering strength 2360 of 1×N×8 is obtained by performing the convolution operation Conv on the second intermediate feature map 2342. The convolution operation Conv three times corresponds to a filter strength neural network 2345.

As described above, neural network-based deblocking filtering is performed using the deblocking filtering coefficient 2365, the deblocking filtering compensation value 2370, and the filtering strength 2360 obtained based on the neural network, and the deblocking filtering target pixel lines 2310.

Specifically, the deblocking filtering target pixel lines 2310 are tripled and tiled using an input of a size of 3×N×8, so that the deblocking filtering target pixel lines 2310 match sizes of the deblocking filtering coefficient 2365 and the deblocking filtering compensation value 2370, a linear operation 2375 of matrix multiplication is performed using the input of 3×N×8 and the deblocking filtering coefficient 2365, the deblocking filtering compensation value 2370 is added 2380 to a result of the linear operation 2375, and residual filtering pixel lines are obtained by performing an elementwise product 2385 on a result of adding the deblocking filtering compensation value 2370 using a result of applying the sigmoid function Sigmoid( ) to the filtering strength 2360.

Average residual filtering pixel lines are obtained by averaging the residual filtering pixel lines, and deblocking filtered pixel lines 2395 of 1×N×8 are obtained by adding 2390 the deblocking filtering target pixel lines 2310 again on the average residual filtering pixel lines. That is, three different outputs are obtained and an average of the three outputs is obtained as a final output. Through this, an ensemble effect in which a prediction error is reduced by averaging a plurality of predictions may be obtained.

Figure 24:
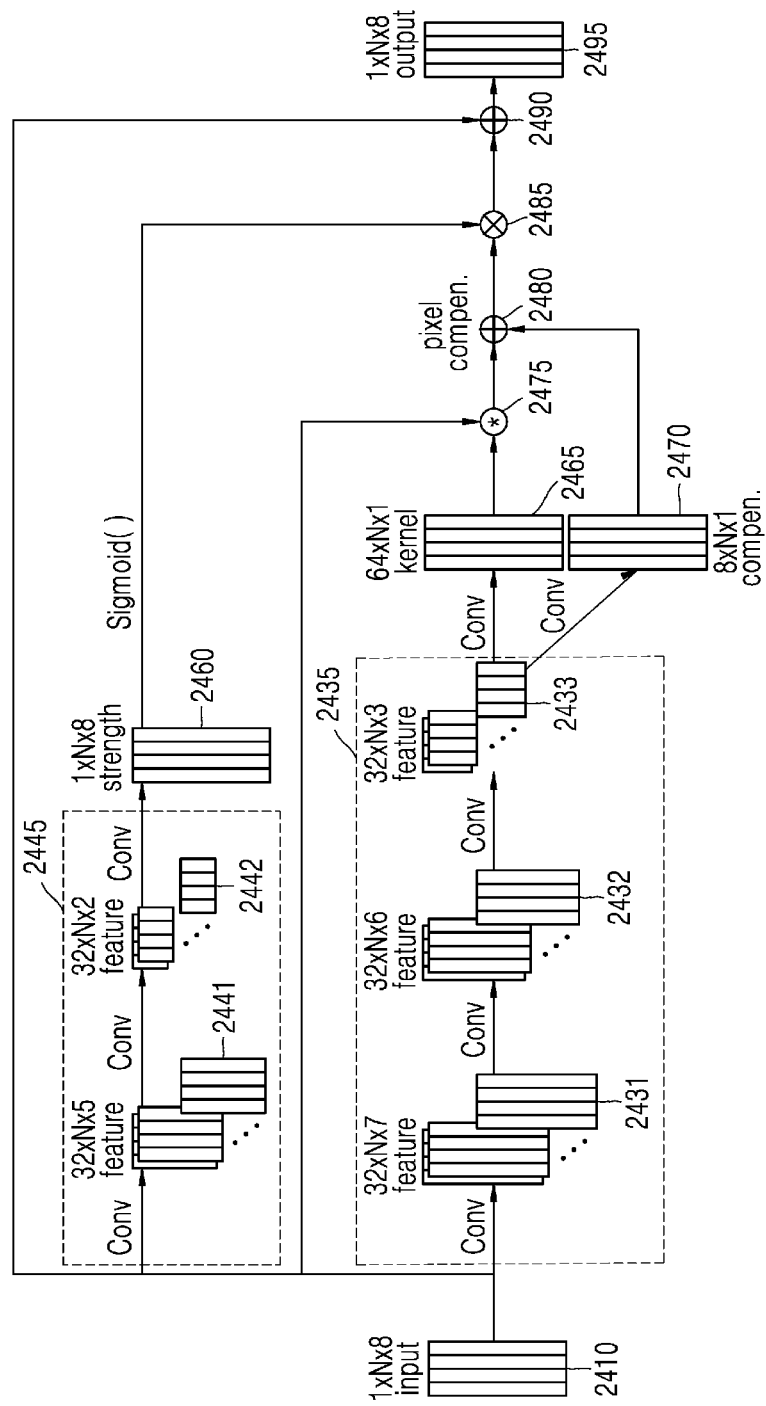
FIG. 24 is a diagram illustrating a structure of neural network-based deblocking filtering according to an embodiment of the disclosure.

FIG. 24 is a diagram illustrating a structure of neural network-based deblocking filtering according to an embodiment of the disclosure.

Referring to FIG. 24, the size of deblocking filter target pixel lines is 1×N×8, which means N lines each including 8 pixels. Metadata with respect to encoding information is not fused to an input, and only deblocking filter target pixels are used as the input.

A first intermediate feature map 2431 of 32×N×7 is obtained by performing the convolution operation Conv on deblocking filtering target pixel lines 2410, a second intermediate feature map 2432 of 32×N×6 is obtained by performing the convolution operation Conv on the first intermediate feature map 2431, and a feature map 2433 of 32×N×3 with respect to the deblocking filtering target pixel lines 2410 is consequently extracted by performing the convolution operation Conv on the second intermediate feature map 2432. The convolution operation Cony three times corresponds to a feature extraction neural network 2435.

A deblocking filtering coefficient 2465 of a 64×N×1 kernel is obtained by performing the convolution operation Cony on a feature map 2433 of the deblocking filtering target pixel lines 2410, and a deblocking filtering compensation value 2470 of 8×N×1 is obtained by performing the convolution operation Cony on the feature map 2433 of the deblocking filtering target pixel lines 2410. Here, the convolution operations Cony respectively correspond to a filter coefficient neural network and a filtering compensation value neural network. In addition, a first intermediate feature map 2441 of 32×N×5 is obtained by performing the convolution operation Cony on the deblocking filtering target pixel lines 2410, a second intermediate feature map 2442 of 32×N×2 is obtained by performing the convolution operation Cony on the first intermediate feature map 2441, and a filtering strength 2460 of 1×N×8 is obtained by performing the convolution operation Cony on the second intermediate feature map 2442. The convolution operation Cony three times corresponds to a filter strength neural network 2445.

As described above, neural network-based deblocking filtering is performed using the deblocking filtering coefficient 2465, the deblocking filtering compensation value 2470, and the filtering strength 2460 obtained based on the neural network, and the deblocking filtering target pixel lines 2410.

Specifically, a linear operation 2475 of matrix multiplication is performed using the deblocking filtering target pixel lines 2410 and the deblocking filtering coefficient 2465, the deblocking filtering compensation value 2470 is added 2480 to a result of the linear operation 2475, and residual filtering pixel lines are obtained by performing an elementwise product 2485 on a result of adding the deblocking filtering compensation value 2470 using a result of applying the sigmoid function Sigmoid( ) to the filtering strength 2460, and deblocking filtered pixel lines 2495 of 1×N×8 are obtained by adding 2490 the deblocking filtering target pixel lines 2410 again on the residual filtering pixel lines.

Figure 25:
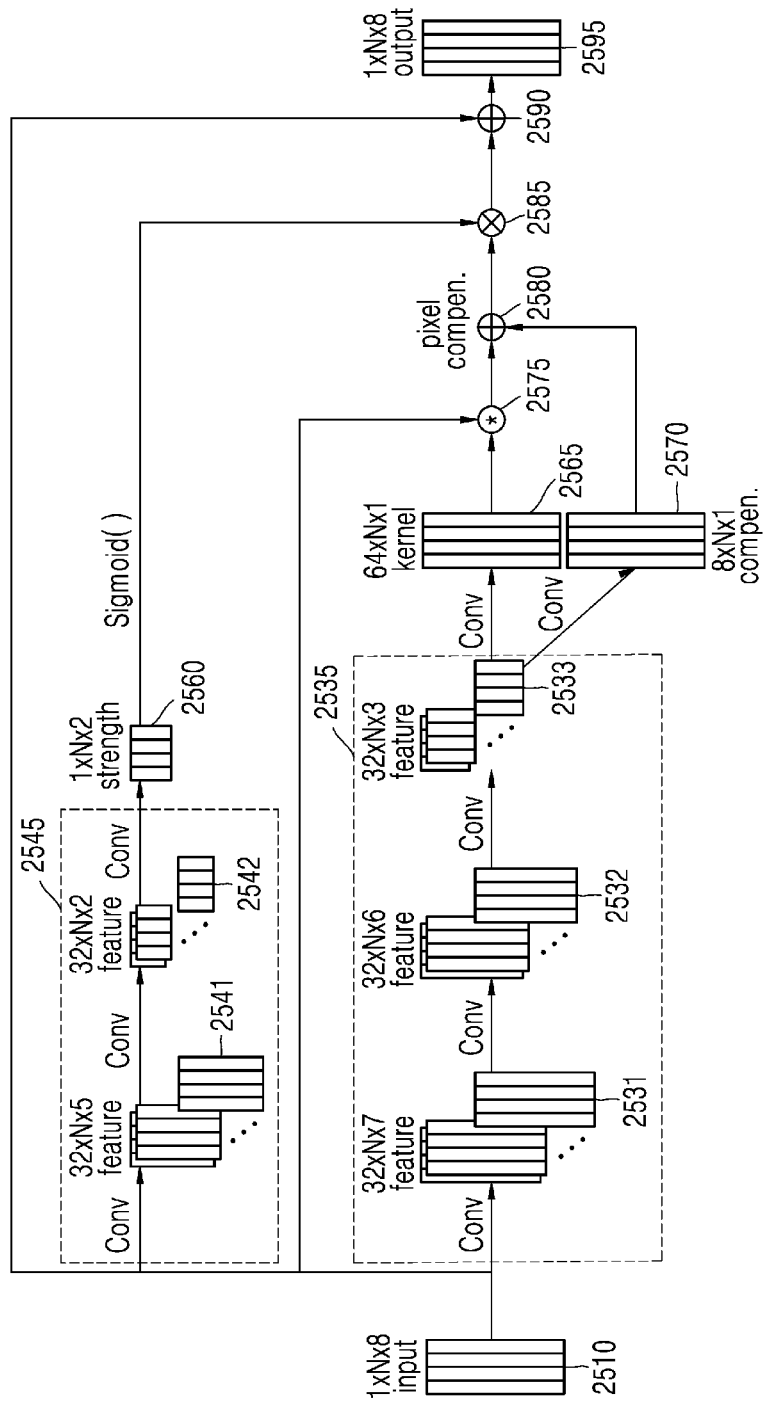
FIG. 25 is a diagram illustrating a structure of neural network-based deblocking filtering according to an embodiment of the disclosure.

FIG. 25 is a diagram illustrating a structure of neural network-based deblocking filtering according to an embodiment of the disclosure.

Referring to FIG. 25, the size of deblocking filter target pixel lines is 1×N×8, which means N lines each including 8 pixels. Metadata with respect to encoding information is not fused to an input, and only deblocking filter target pixels are used as the input.

A first intermediate feature map 2531 of 32×N×7 is obtained by performing the convolution operation Cony on deblocking filtering target pixel lines 2510, a second intermediate feature map 2532 of 32×N×6 is obtained by performing the convolution operation Cony on the first intermediate feature map 2531, and a feature map 2533 of 32×N×3 with respect to the deblocking filtering target pixel lines 2510 is consequently extracted by performing the convolution operation Cony on the second intermediate feature map 2532. The convolution operation Cony three times corresponds to a feature extraction neural network 2535.

A deblocking filtering coefficient 2565 of a 64×N×1 kernel is obtained by performing the convolution operation Cony on a feature map 2533 of the deblocking filtering target pixel lines 2510, and a deblocking filtering compensation value 2570 of 8×N×1 is obtained by performing the convolution operation Cony on the feature map 2533 of the deblocking filtering target pixel lines 2510. Here, the convolution operations Cony respectively correspond to a filter coefficient neural network and a filtering compensation value neural network. In addition, a first intermediate feature map 2541 of 32×N×5 is obtained by performing the convolution operation Cony on the deblocking filtering target pixel lines 2510, a second intermediate feature map 2542 of 32×N×2 is obtained by performing the convolution operation Cony on the first intermediate feature map 2541, and a filtering strength 2560 of 1×N×2 is obtained by performing the convolution operation Cony on the second intermediate feature map 2542. The convolution operation Cony three times corresponds to a filter strength neural network 2545.

As described above, neural network-based deblocking filtering is performed using the deblocking filtering coefficient 2565, the deblocking filtering compensation value 2570, and the filtering strength 2560 obtained based on the neural network, and the deblocking filtering target pixel lines 2510.

Specifically, a linear operation 2575 of matrix multiplication is performed using the deblocking filtering target pixel lines 2510 and the deblocking filtering coefficient 2565, the deblocking filtering compensation value 2570 is added 2580 to a result of the linear operation 2575, and residual filtering pixel lines are obtained by performing an elementwise product 2585 on a result of adding the deblocking filtering compensation value 2570 using a result of applying the sigmoid function Sigmoid( ) to the filtering strength 2560.

Because the size of the filtering strength 2560 generated through the filtering strength neural network 2545 is 1×N×2 and the size of the deblocking filtering target pixel lines 2510 is 1×N×8, a method of applying the filtering strength 2560 is different. Specifically, when horizontal line filtering is performed on a boundary of two blocks adjacent in a horizontal direction, with respect to each of a right boundary of a left block and a left boundary of a right block, a filtering strength of 1×N×2 is divided and an elementwise product is performed on each boundary using the filtering strength of 1×N×2, and when vertical line filtering is performed on a boundary of two blocks adjacent in a horizontal direction, with respect to each of an upper boundary of a lower block and a lower boundary of an upper block, the filtering strength of 1×N×2 is divided and an elementwise product is performed on each boundary using the filtering strength of 1×N×2. That is, the filtering strength of 1×N×2 is separately applied to each side surface of pixel lines to be filtered. Because deblocking filtering removes a blocking artifact at the boundary of a block, different filtering strengths may be applied at the boundary of the block.

Deblocking filtered pixel lines 2595 of 1×N×8 are obtained by adding 2590 again the deblocking filtering target pixel lines 2510 to the obtained residual filtering pixel lines.

Figure 26:
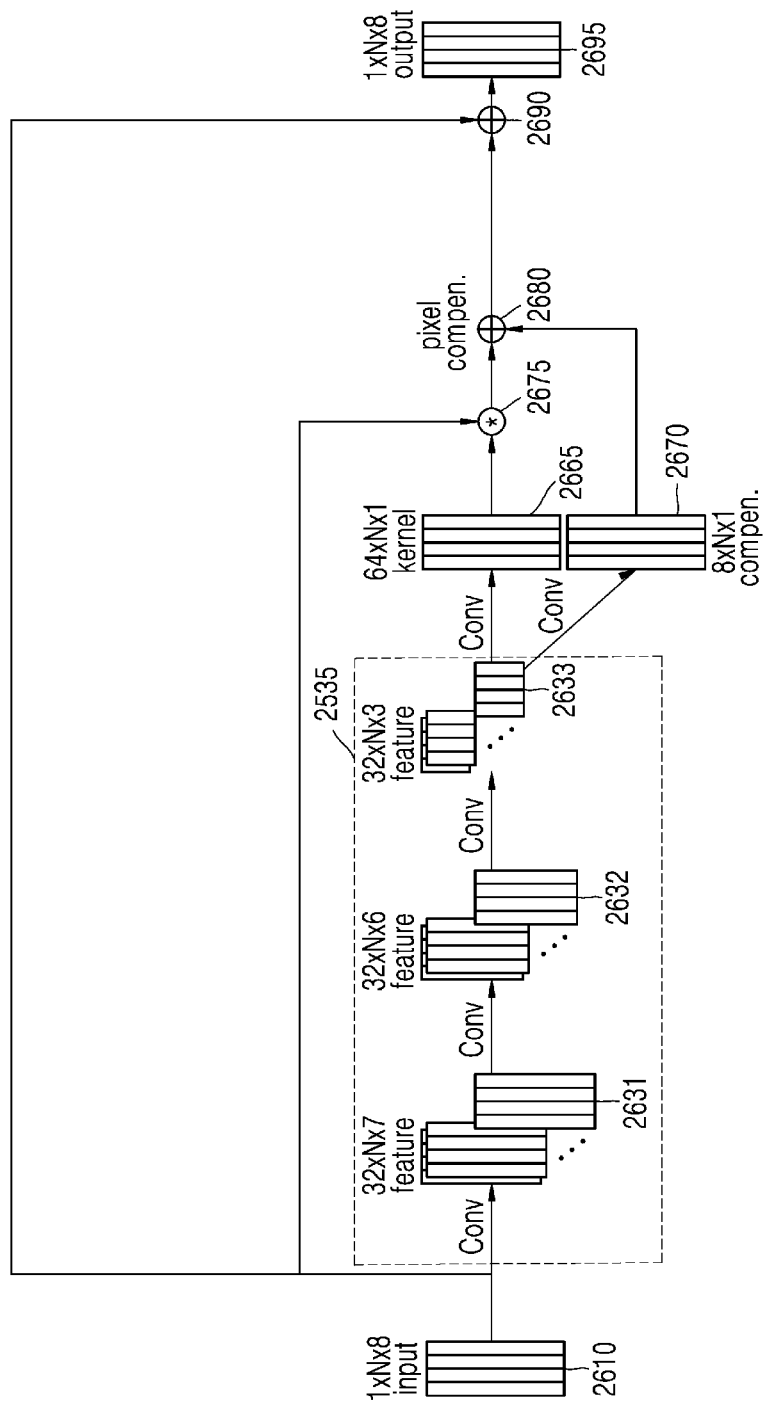
FIG. 26 is a diagram illustrating a structure of neural network-based deblocking filtering according to an embodiment of the disclosure.

FIG. 26 is a diagram illustrating a structure of neural network-based deblocking filtering according to an embodiment of the disclosure.

Referring to FIG. 26, the size of deblocking filter target pixel lines is 1×N×8, which means N lines each including 8 pixels. Metadata with respect to encoding information is not fused to an input, and only deblocking filter target pixels are used as the input.

A first intermediate feature map 2631 of 32×N×7 is obtained by performing the convolution operation Cony on deblocking filtering target pixel lines 2610, a second intermediate feature map 2632 of 32×N×6 is obtained by performing the convolution operation Cony on the first intermediate feature map 2631, and a feature map 2633 of 32×N×3 with respect to the deblocking filtering target pixel lines 2610 is consequently extracted by performing the convolution operation Cony on the second intermediate feature map 2632. The convolution operation Cony three times corresponds to a feature extraction neural network 2635.

A deblocking filtering coefficient 2665 of a 64×N×1 kernel is obtained by performing the convolution operation Cony on a feature map 2633 of the deblocking filtering target pixel lines 2610, and a deblocking filtering compensation value 2670 of 8×N×1 is obtained by performing the convolution operation Cony on the feature map 2633 of the deblocking filtering target pixel lines 2610. Here, the convolution operations Cony respectively correspond to a filter coefficient neural network and a filtering compensation value neural network.

As described above, neural network-based deblocking filtering is performed using the deblocking filtering coefficient 2665 and the deblocking filtering compensation value 2670 obtained based on the neural network, and the deblocking filtering target pixel lines 2610.

Specifically, a linear operation 2675 of matrix multiplication is performed using the deblocking filtering target pixel lines 2610 and the deblocking filtering coefficient 2665, residual filtering pixel lines are obtained by adding 2680 the deblocking filtering compensation value 2870 to a result of the linear operation 2675, and deblocking filtered pixel lines 2695 of 1×N×8 are obtained by adding 2690 the deblocking filtering target pixel lines 2610 again on the residual filtering pixel lines.

Figure 27:
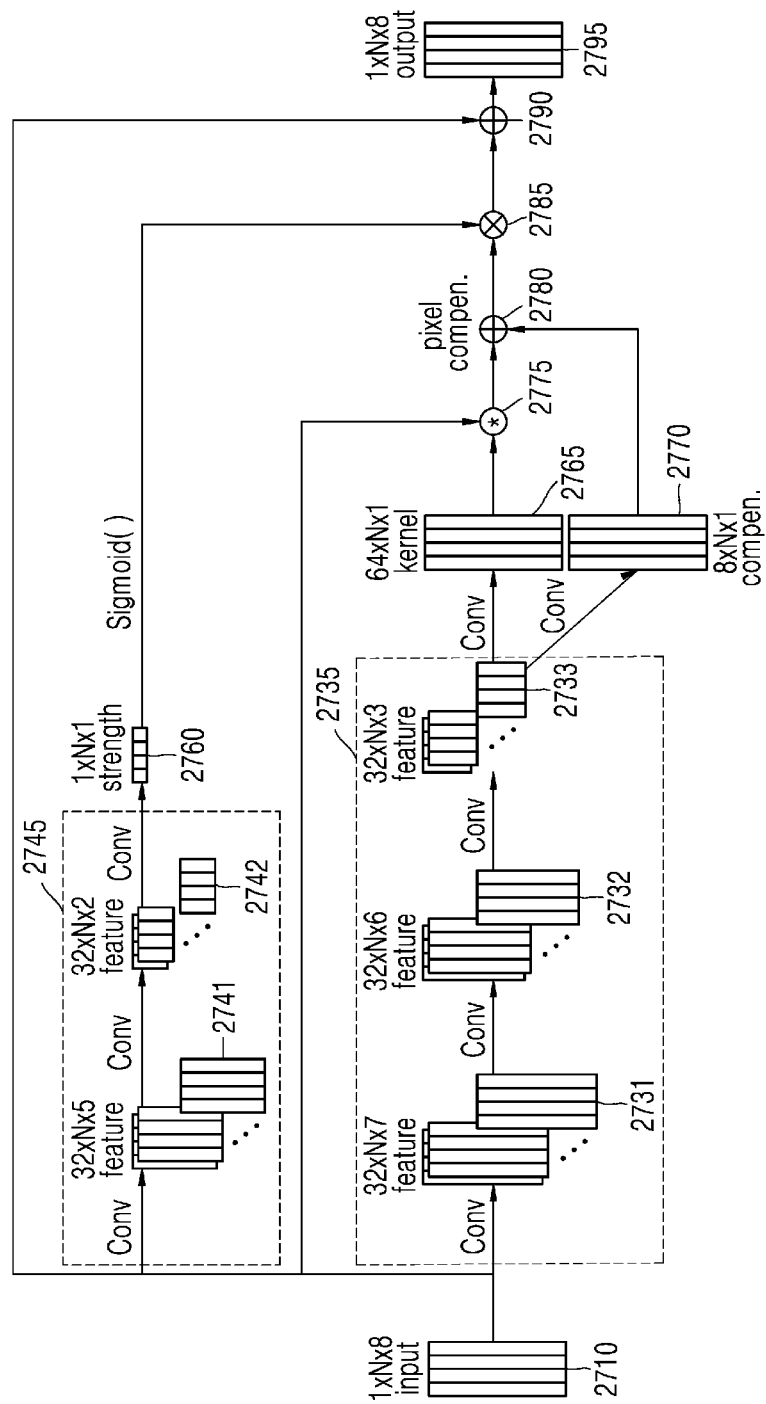
FIG. 27 is a diagram illustrating a structure of neural network-based deblocking filtering according to an embodiment of the disclosure.

FIG. 27 is a diagram illustrating a structure of neural network-based deblocking filtering according to an embodiment of the disclosure.

Referring to FIG. 27, the size of deblocking filter target pixel lines is 1×N×8, which means N lines each including 8 pixels. Metadata with respect to encoding information is not fused to an input, and only deblocking filter target pixels are used as the input.

A first intermediate feature map 2731 of 32×N×7 is obtained by performing the convolution operation Cony on deblocking filtering target pixel lines 2710, a second intermediate feature map 2732 of 32×N×6 is obtained by performing the convolution operation Cony on the first intermediate feature map 2731, and a feature map 2733 of 32×N×3 with respect to the deblocking filtering target pixel lines 2710 is consequently extracted by performing the convolution operation Cony on the second intermediate feature map 2732. The convolution operation Cony three times corresponds to a feature extraction neural network 2735.

A deblocking filtering coefficient 2765 of a 64×N×1 kernel is obtained by performing the convolution operation Cony on a feature map 2733 of the deblocking filtering target pixel lines 2710, and a deblocking filtering compensation value 2770 of 8×N×1 is obtained by performing the convolution operation Cony on the feature map 2733 of the deblocking filtering target pixel lines 2710. Here, the convolution operations Cony respectively correspond to a filter coefficient neural network and a filtering compensation value neural network. In addition, a first intermediate feature map 2741 of 32×N×5 is obtained by performing the convolution operation Cony on the deblocking filtering target pixel lines 2710, a second intermediate feature map 2742 of 32×N×2 is obtained by performing the convolution operation Cony on the first intermediate feature map 2741, and a filtering strength 2760 of 1×N×1 is obtained by performing the convolution operation Cony on the second intermediate feature map 2742. The convolution operation Cony three times corresponds to a filter strength neural network 2745.

As described above, neural network-based deblocking filtering is performed using the deblocking filtering coefficient 2765, the deblocking filtering compensation value 2770, and the filtering strength 2760 obtained based on the neural network, and the deblocking filtering target pixel lines 2710.

Specifically, a linear operation 2775 of matrix multiplication is performed using the deblocking filtering target pixel lines 2710 and the deblocking filtering coefficient 2765, the deblocking filtering compensation value 2770 is added 2780 to a result of the linear operation 2575, and residual filtering pixel lines are obtained by performing an elementwise product 2785 on a result of adding the deblocking filtering compensation value 2770 using a result of applying the sigmoid function Sigmoid( ) to the filtering strength 2760.

Because the size of the filtering strength 2760 generated through the filtering strength neural network 2745 is 1×N×1 and the size of the deblocking filtering target pixel lines 2710 is 1×N×8, a method of applying the filtering strength 2760 is different.

For example, when horizontal line filtering is performed on a boundary of two blocks adjacent in a horizontal direction, with respect to each of a right boundary of a left block and a left boundary of a right block, an elementwise product is performed on each boundary using the same filtering strength of 1×N×1, and when vertical line filtering is performed on a boundary of two blocks adjacent in a horizontal direction, with respect to each of an upper boundary of a lower block and a lower boundary of an upper block, an elementwise product is performed on each boundary using the same filtering strength of 1×N×1.

Also, as another example, elementwise product may be performed by equally applying a filtering strength of 1×N×1 to all pixel lines to be filtered.

Deblocking filtered pixel lines 2795 of 1×N×8 are obtained by adding 2790 again the deblocking filtering target pixel lines 2710 to the obtained residual filtering pixel lines.

Figure 28:
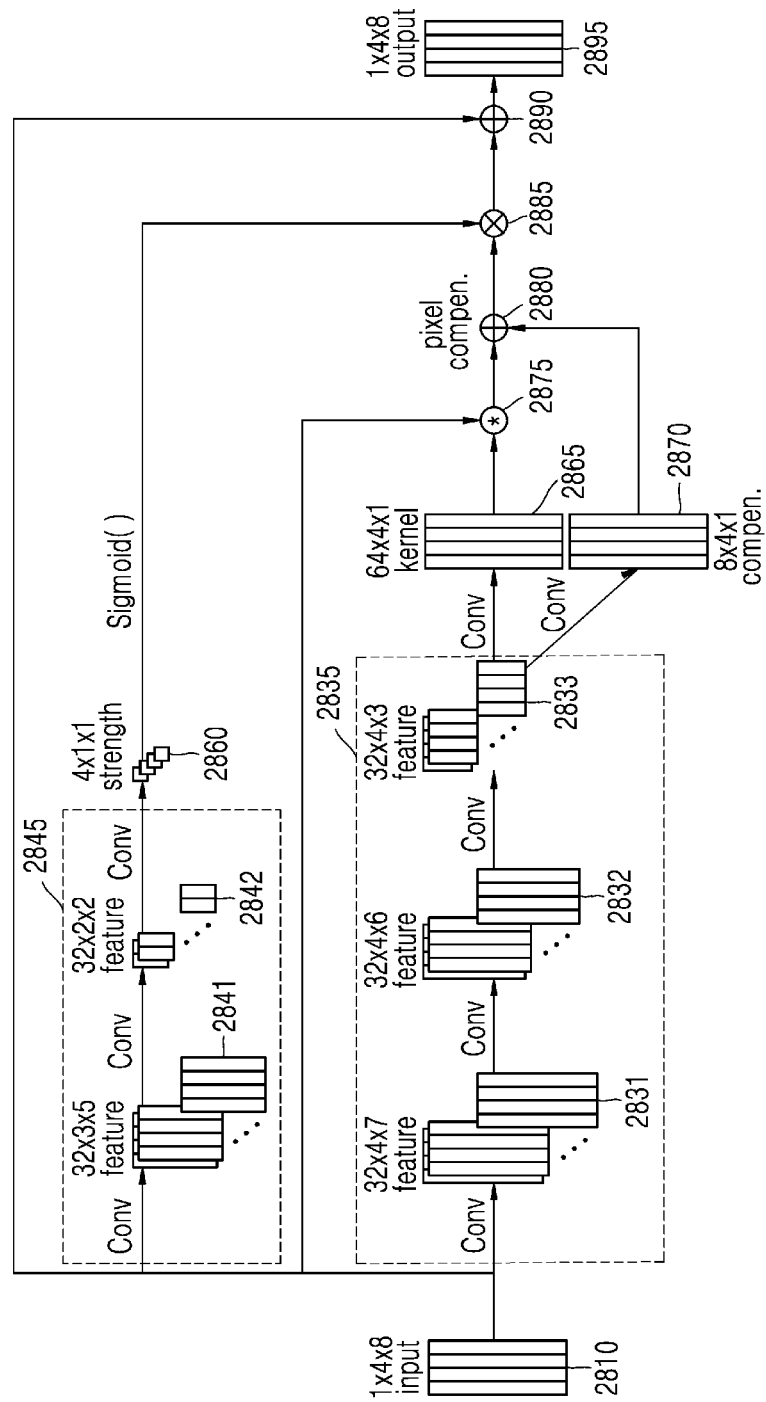
FIG. 28 is a diagram illustrating a structure of neural network-based deblocking filtering according to an embodiment of the disclosure.

FIG. 28 is a diagram illustrating a structure of neural network-based deblocking filtering according to an embodiment of the disclosure.

Referring to FIG. 28, the size of deblocking filter target pixel lines is 1×N×8, which means 4 lines each including 8 pixels. Metadata with respect to encoding information is not fused to an input, and only deblocking filter target pixels are used as the input.

A first intermediate feature map 2831 of 32×4×7 is obtained by performing the convolution operation Cony on deblocking filtering target pixel lines 2810, a second intermediate feature map 2832 of 32×4×6 is obtained by performing the convolution operation Cony on the first intermediate feature map 2831, and a feature map 2833 of 32×4×3 with respect to the deblocking filtering target pixel lines 2810 is consequently extracted by performing the convolution operation Cony on the second intermediate feature map 2832. The convolution operation Cony three times corresponds to a feature extraction neural network 2835.

A deblocking filtering coefficient 2865 of a 64×4×1 kernel is obtained by performing the convolution operation Cony on a feature map 2833 of the deblocking filtering target pixel lines 2810, and a deblocking filtering compensation value 2870 of 8×4×1 is obtained by performing the convolution operation Cony on the feature map 2833 of the deblocking filtering target pixel lines 2810. Here, the convolution operations Cony respectively correspond to a filter coefficient neural network and a filtering compensation value neural network. In addition, a first intermediate feature map 2841 of 32×3×5 is obtained by performing the convolution operation Cony on the deblocking filtering target pixel lines 2810, a second intermediate feature map 2842 of 32×2×2 is obtained by performing the convolution operation Cony on the first intermediate feature map 2841, and a filtering strength 2860 of 4×1×1 is obtained by performing the convolution operation Cony on the second intermediate feature map 2842. The convolution operation Cony three times corresponds to a filter strength neural network 2845.

As described above, neural network-based deblocking filtering is performed using the deblocking filtering coefficient 2865, the deblocking filtering compensation value 2870, and the filtering strength 2860 obtained based on the neural network, and the deblocking filtering target pixel lines 2810.

Specifically, a linear operation 2875 of matrix multiplication is performed using the deblocking filtering target pixel lines 2810 and the deblocking filtering coefficient 2865, the deblocking filtering compensation value 2870 is added to a result of the linear operation 2875, and residual filtering pixel lines are obtained by performing an elementwise product 2885 on a result of adding the deblocking filtering compensation value 2870 using a result of applying the sigmoid function Sigmoid( ) to the filtering strength 2860.

Because the size of the filtering strength 2860 generated through the filtering strength neural network 2745 is 4×1×1 and the size of the deblocking filtering target pixel lines 2810 is 1×4×8, a method of applying the filtering strength 2860 is different. Unlike the filtering strength 2760 of FIG. 27, because the filtering strength 2860 of FIG. 28 has a different dimension, the filtering strength 2860 may be applied by switching the dimension in accordance with the size of the deblocking filtering target pixel lines 2810. That is, the filtering strength 2860 may be applied by transforming 4×1×1 of the filtering strength 2860 into 1×4×1.

For example, when horizontal line filtering is performed on a boundary of two blocks adjacent in a horizontal direction, with respect to each of a right boundary of a left block and a left boundary of a right block, an elementwise product is performed on each boundary using the same filtering strength of 1×4×1, and when vertical line filtering is performed on a boundary of two blocks adjacent in a horizontal direction, with respect to each of an upper boundary of a lower block and a lower boundary of an upper block, an elementwise product is performed on each boundary using the same filtering strength of 1×4×1.

Also, as another example, elementwise product may be performed by equally applying a filtering strength of 1×4×1 to all pixel lines to be filtered.

Deblocking filtered pixel lines 2895 of 1×4×8 are obtained by adding 2890 again the deblocking filtering target pixel lines 2810 to the obtained residual filtering pixel lines.

Figure 29:
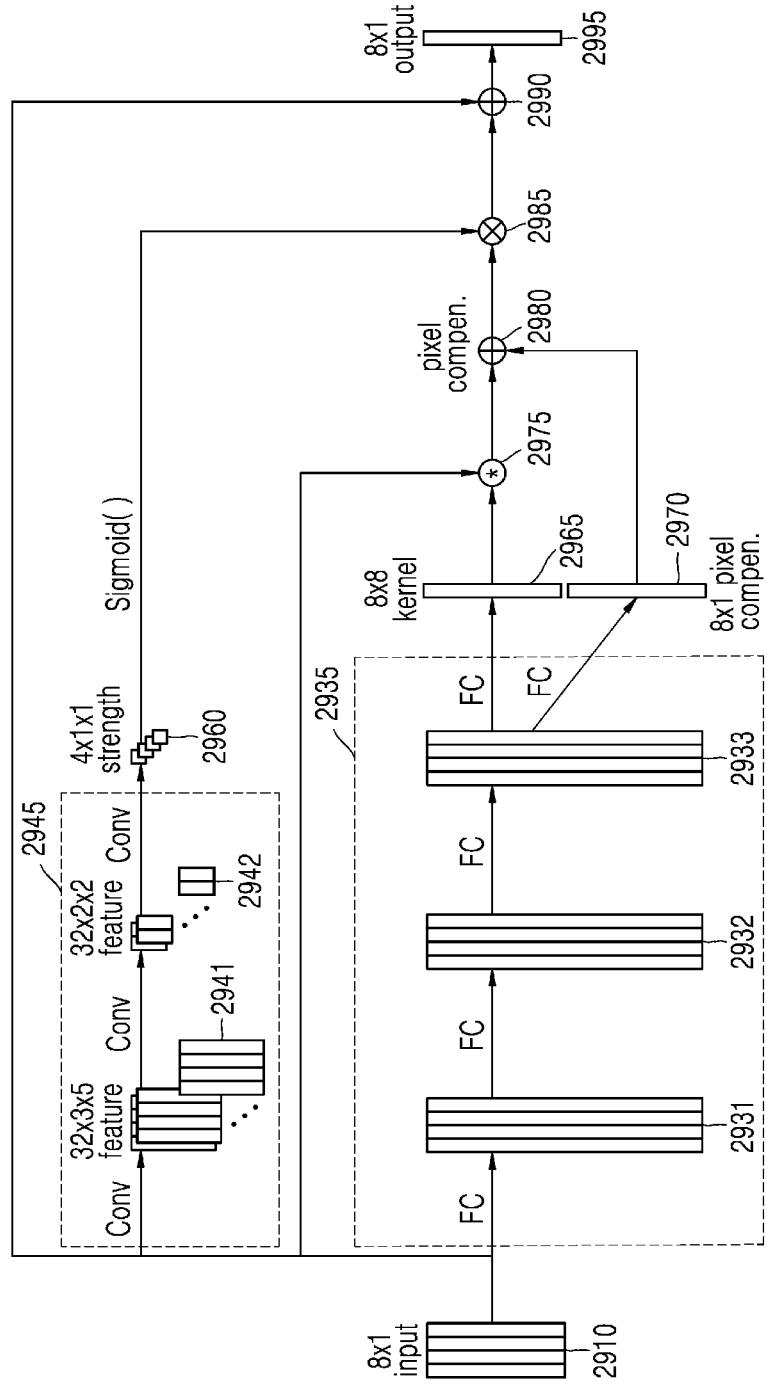
FIG. 29 is a diagram illustrating a structure of neural network-based deblocking filtering according to an embodiment of the disclosure.

FIG. 29 is a diagram illustrating a structure of neural network-based deblocking filtering according to an embodiment of the disclosure.

Referring to FIG. 29, the size of a deblocking filter target pixel line is 8×1, which means one line including 8 pixels. Metadata with respect to encoding information is not fused to an input, and only deblocking filter target pixels are used as the input. In addition, as inputs for obtaining a deblocking filtering coefficient 2965, a deblocking filtering compensation value 2970, and a filtering strength 2960, input data of 1×4×8 of 4 lines including deblocking filtering target pixel lines of 8×1 are used. This to obtain the more effective deblocking filtering coefficient 2965, deblocking filtering compensation value 2970, and filtering strength 2960 by further using additional information around the deblocking filtering target pixel lines of 8×1.

A first intermediate feature map 2931 is obtained by inputting the input data of 1×4×8 of 4 lines including a deblocking filtering target pixel line 2910 to the fully-connected layer FC, a second intermediate feature map 2932 is obtained by inputting the first intermediate feature map 2931 to the fully-connected layer FC, and a feature map 2933 with respect to the input data of 1×4×8 of 4 lines including the deblocking filtering target pixel line 2910 is consequently extracted by inputting the second intermediate feature map 2932 to the fully-connected layer FC. Here, the input to the fully-connected layer FC three times corresponds to a feature extraction neural network 2935.

A deblocking filtering coefficient 2965 of an 8×8 kernel is obtained by inputting the extracted feature map 2933 to the fully-connected layer FC, and the deblocking filtering compensation value 2970 of 8×1 is obtained by inputting the extracted feature map 2933 to the fully-connected layer FC. Here, the inputs to the fully-connected layer FC respectively correspond to a filter coefficient neural network and a filtering compensation neural network. In addition, a first intermediate feature map 2941 of 32×3×5 is obtained by performing the convolution operation Cony on the input data of 1×4×8 of 4 lines including the deblocking filtering target pixel line 2910, a second intermediate feature map 2942 of 32×N×2 is obtained by performing the convolution operation Cony on the first intermediate feature map 2941, and a filtering strength 2960 of 4×1×1 is obtained by performing the convolution operation Cony on the second intermediate feature map 2942. The convolution operation Cony three times corresponds to a filter strength neural network 2945.

As described above, neural network-based deblocking filtering is performed using the deblocking filtering coefficient 2965, the deblocking filtering compensation value 2970, and the filtering strength 2960 obtained based on the neural network, and the deblocking filtering target pixel line 2910.

Specifically, a linear operation 2975 of matrix multiplication is performed using the deblocking filtering target pixel line 2910 and the deblocking filtering coefficient 2965, the deblocking filtering compensation value 2970 is added 2980 to a result of the linear operation 2975, and a residual filtering pixel line is obtained by performing an elementwise product 2985 on a result of adding the deblocking filtering compensation value 2970 using a result of applying the sigmoid function Sigmoid( ) to the filtering strength 2960.

Because the size of the filtering strength 2960 generated through the filtering strength neural network 2945 is 4×1×1 and the size of the deblocking filtering target pixel lines 2910 is 8×1, a method of applying the filtering strength 2960 is different. Because the size of the filtering strength 2960 of 4×1×1 is different from that of the deblocking filtering pixel 2910 of 8×1, the filtering strength 2960 may be applied by switching the size in accordance with the size of the deblocking filtering target pixel line 2910. That is, the filtering strength 2960 may be applied twice to the deblocking filtering pixel 2910 of 8×1 by transforming 4×1×1 of the filtering strength 2960 into 4×1.

Also, as another example, an elementwise product may be performed by applying the filtering strength 2960 of 4×1 to only a part of the deblocking filtering target pixel 2910 of 8×1 including a block boundary.

Deblocking filtered pixel lines 2995 of 8×1 are obtained by adding 2990 the deblocking filtering target pixel line 2910 again to the obtained residual filtering pixel line.

Figure 30:
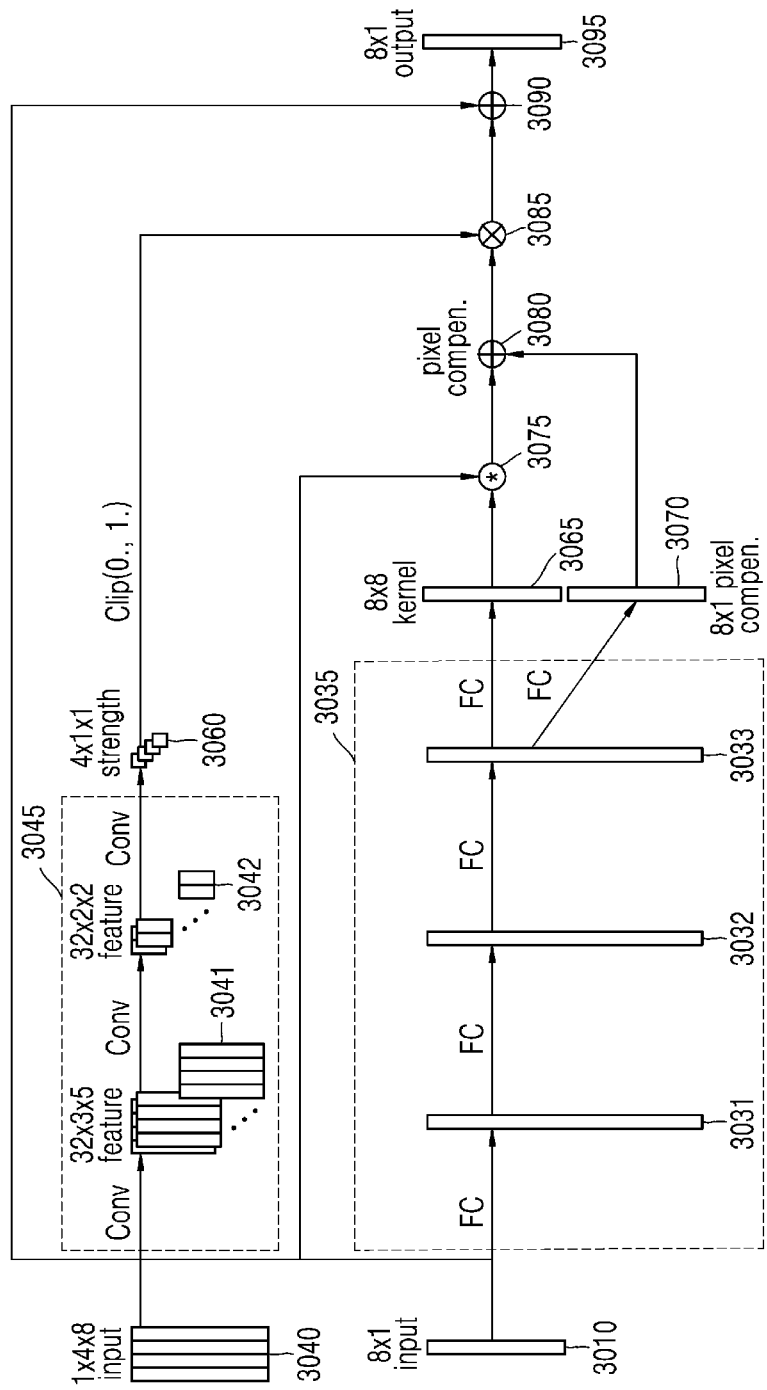
FIG. 30 is a diagram illustrating a structure of neural network-based deblocking filtering according to an embodiment of the disclosure.

FIG. 30 is a diagram illustrating a structure of neural network-based deblocking filtering according to an embodiment of the disclosure.

Referring to FIG. 30, the size of a deblocking filter target pixel line is 8×1, which means one line including 8 pixels. Further, in order to obtain a filtering strength, a plurality of lines of deblocking filter target pixels including the deblocking filter target pixel line are used. This to obtain a more effective filtering strength 3060 by further using additional information around the deblocking filter target pixel line of 8×1.

A first intermediate feature map 3031 is obtained by inputting a deblocking filtering target pixel line 3010 to the fully-connected layer FC, a second intermediate feature map 3032 is obtained by inputting the first intermediate feature map 3031 to the fully-connected layer FC, and a feature map 3033 with respect to the deblocking filtering target pixel line 3010 is consequently extracted by inputting the second intermediate feature map 3032 to the fully-connected layer FC. Here, the input to the fully-connected layer FC three times corresponds to a feature extraction neural network 3035.

A deblocking filtering coefficient 3065 of an 8×8 kernel is obtained by inputting the feature map 3033 of the deblocking filtering target pixel line 3010 to the fully-connected layer FC, and a deblocking filtering compensation value 3070 of 8×1 is obtained by inputting the feature map 3033 of the deblocking filtering target pixel line 3010 to the fully-connected layer FC. Here, the inputs to the fully-connected layer FC respectively correspond to a filter coefficient neural network and a filtering compensation neural network. In addition, a first intermediate feature map 3041 of 32×3×5 is obtained by performing the convolution operation Cony on deblocking filtering target pixel lines 3040 of 1×4×8 including the deblocking filtering target pixel line 3010 of 8×1, a second intermediate feature map 3042 of 32×2×2 is obtained by performing the convolution operation Cony on the first intermediate feature map 3041, and a filtering strength 3060 of 4×1×1 is obtained by performing the convolution operation Cony on the second intermediate feature map 3042. The convolution operation Cony three times corresponds to a filter strength neural network 3045.

As described above, neural network-based deblocking filtering is performed using the deblocking filtering coefficient 3065, the deblocking filtering compensation value 3070, and the filtering strength 3060 obtained based on the neural network, and the deblocking filtering target pixel line 3010.

Specifically, a linear operation 3075 of matrix multiplication is performed using the deblocking filtering target pixel line 3010 and the deblocking filtering coefficient 3065, the deblocking filtering compensation value 3070 is added 3080 to a result of the linear operation 3075, and a residual filtering pixel line is obtained by performing an elementwise product 3085 on a result of adding the deblocking filtering compensation value 3070 using a result of applying a clip function Clip(0, 1) to the filtering strength 3060.

Because the size of the filtering strength 3060 generated through the filtering strength neural network 3045 is 4×1×1 and the size of the deblocking filtering target pixel lines 3010 is 8×1, a method of applying the filtering strength 3060 is different. Because the size of the filtering strength 3060 of 4×1×1 is different from that of the deblocking filtering pixel 3010 of 8×1, the filtering strength 3060 may be applied by switching the size in accordance with the size of the deblocking filtering target pixel line 3010. That is, the filtering strength 3060 may be applied twice to the deblocking filtering pixel 3010 of 8×1 by transforming 4×1×1 of the filtering strength 3060 into 4×1.

Also, as another example, an elementwise product may be performed by applying the filtering strength 3060 of 4×1 to only a part of the deblocking filtering target pixel 3010 of 8×1 including a block boundary.

A deblocking filtered pixel line 3095 of 8×1 is obtained by adding 3090 the deblocking filtering target pixel line 3010 again to the obtained residual filtering pixel line.

Figure 31:
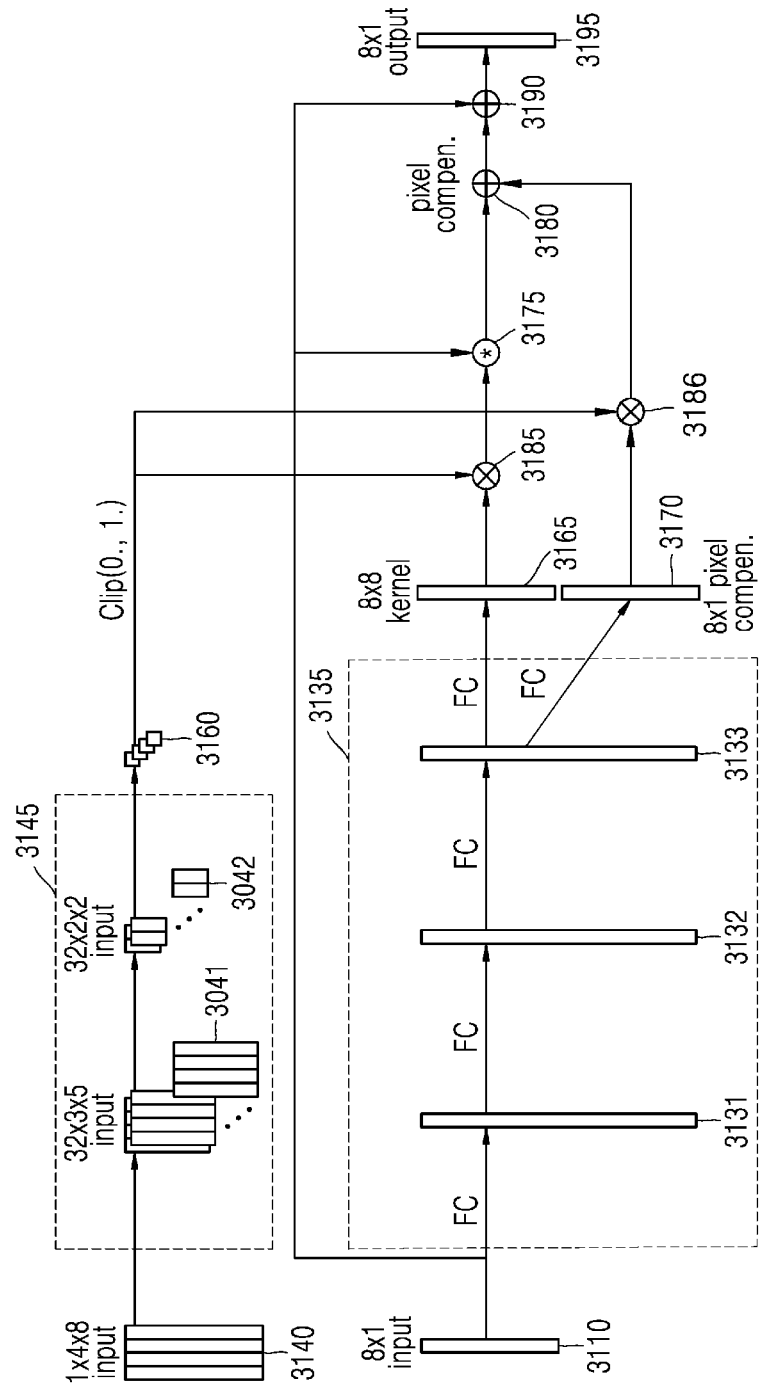
FIG. 31 is a diagram illustrating a structure of neural network-based deblocking filtering according to an embodiment of the disclosure.

FIG. 31 is a diagram illustrating a structure of neural network-based deblocking filtering according to an embodiment of the disclosure.

Referring to FIG. 31, the size of a deblocking filter target pixel line is 8×1, which means one line including 8 pixels. Further, in order to obtain a filtering strength, a plurality of lines of deblocking filter target pixels are used. This to obtain a more effective filtering strength 3160 by further using additional information around the deblocking filter target pixel line of 8×1.

A first intermediate feature map 3131 is obtained by inputting a deblocking filtering target pixel line 3110 to the fully-connected layer FC, a second intermediate feature map 3132 is obtained by inputting the first intermediate feature map 3131 to the fully-connected layer FC, and a feature map 3133 with respect to the deblocking filtering target pixel line 3110 is consequently extracted by inputting the second intermediate feature map 3132 to the fully-connected layer FC. Here, the input to the fully-connected layer FC three times corresponds to a feature extraction neural network 3135.

A deblocking filtering coefficient 3165 of an 8×8 kernel is obtained by inputting the feature map 3133 of the deblocking filtering target pixel line 3110 to the fully-connected layer FC, and a deblocking filtering compensation value 3170 of 8×1 is obtained by inputting the feature map 3133 of the deblocking filtering target pixel line 3110 to the fully-connected layer FC. Here, the inputs to the fully-connected layer FC respectively correspond to a filter coefficient neural network and a filtering compensation neural network. In addition, a first intermediate feature map 3141 of 32×3×5 is obtained by performing the convolution operation Cony on deblocking filtering target pixel lines 3140 of 1×4×8 including the deblocking filtering target pixel line 3110 of 8×1, a second intermediate feature map 3142 of 32×2×2 is obtained by performing the convolution operation Cony on the first intermediate feature map 3141, and a filtering strength 3160 of 4×1×1 is obtained by performing the convolution operation Cony on the second intermediate feature map 3142. The convolution operation Cony three times corresponds to a filter strength neural network 3145.

As described above, neural network-based deblocking filtering is performed using the deblocking filtering coefficient 3165, the deblocking filtering compensation value 3170, and the filtering strength 3160 obtained based on the neural network, and the deblocking filtering target pixel line 3110.

Specifically, an elementwise product 3185 is performed on the deblocking filtering coefficient 3165 using a result of applying the clip function Clip(0, 1) to the filtering strength 3160, a linear operation 3175 of matrix multiplication is performed using a result of performing the elementwise product 3185 and the deblocking filtering target pixel line

3110, an elementwise product 3186 is performed on the deblocking filtering compensation value 3170 using the result of applying the clip function Clip(0, 1) to the filtering strength 3160, a result of performing the elementwise product 3186 is added 3180 to a result of the a linear operation 3175, and residual filtering pixel lines are obtained according to a result of adding the result of performing the elementwise product 3186 and the result of the linear operation 3175.

Because the size of the filtering strength 3160 generated through the filtering strength neural network 3145 is 4×1×1, the size of the deblocking filtering coefficient 3165 is 8×8, and the size of the deblocking filtering compensation value 3170 is 8×1, a method of applying the filtering strength 3160 is different. Because the size of the filtering strength 3160 of 4×1×1 is different from that of each of the deblocking filtering coefficient 3165 of 8×8 and the deblocking filtering compensation value 3170 of 8×1, the filtering strength 3160 may be applied by switching the size in accordance with the sizes of the deblocking filtering coefficient 3165 and the deblocking filtering compensation value 3170. That is, the filtering strength 3160 may be applied to the deblocking filtering coefficient 3165 of 8×8 sixteen times and to the deblocking filtering compensation value 3170 of 8×1 two times, by transforming 4×1×1 of the filtering strength 3160 into 4×1.

Also, as another example, an elementwise product may be performed by applying the filtering strength 3160 of 4×1 only to a part of the deblocking filtering coefficient 3165 of 8×8 that is applied to a block boundary, and applying the filtering strength 3160 of 4×1 only to a part of the deblocking filtering compensation value 3170 of 8×1 that is applied to the block boundary.

Deblocking filtered pixel lines 3195 of 8×1 are obtained by adding 3190 the deblocking filtering target pixel line 3110 again to the obtained residual filtering pixel lines.

FIG. 31 is an embodiment of the disclosure in which a result that is substantially the same as that in FIG. 30 is obtained, except that the order in which an elementwise product of a filtering strength is performed is changed.

Figure 32:
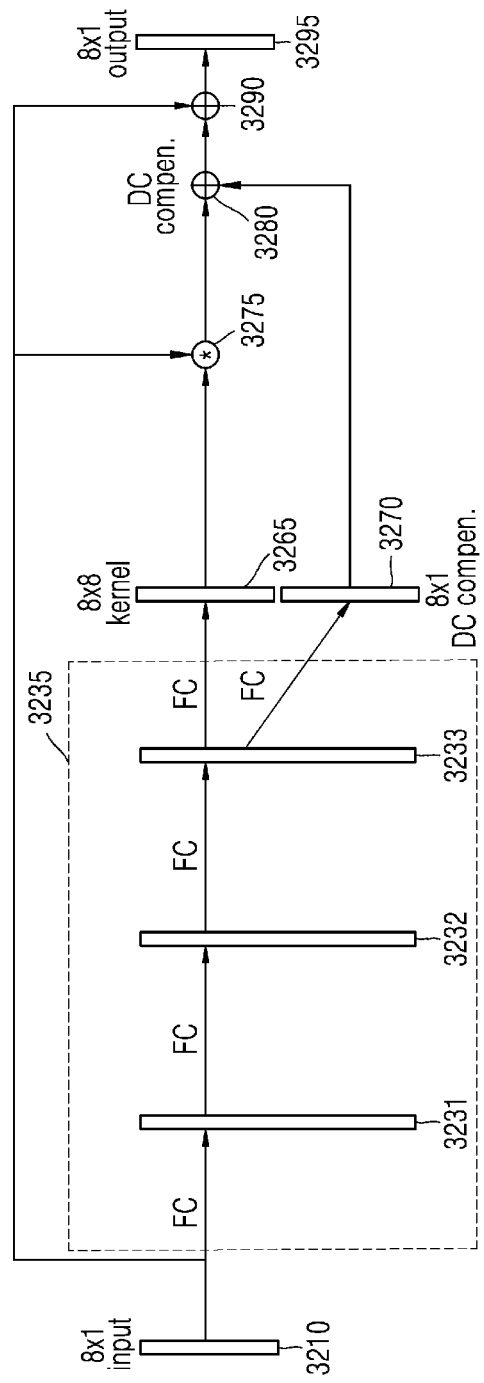
FIG. 32 is a diagram illustrating a structure of neural network-based deblocking filtering according to an embodiment of the disclosure.

FIG. 32 is a diagram illustrating a structure of neural network-based deblocking filtering according to an embodiment of the disclosure.

Referring to FIG. 32, the size of a deblocking filter target pixel line is 8×1, which means one line including 8 pixels.

A first intermediate feature map 3231 is obtained by inputting a deblocking filtering target pixel line 3210 to the fully-connected layer FC, a second intermediate feature map 3232 is obtained by inputting the first intermediate feature map 3231 to the fully-connected layer FC, and a feature map 3233 with respect to the deblocking filtering target pixel line 3210 is consequently extracted by inputting the second intermediate feature map 3232 to the fully-connected layer FC. Here, the input to the fully-connected layer FC three times corresponds to a feature extraction neural network 3235.

A deblocking filtering coefficient 3265 of an 8×8 kernel is obtained by inputting the feature map 3233 of the deblocking filtering target pixel line 3210 to the fully-connected layer FC, and a deblocking filtering compensation value 3270 of 8×1 is obtained by inputting the feature map 3233 of the deblocking filtering target pixel line 3210 to the fully-connected layer FC. Here, the inputs to the fully-connected layer FC respectively correspond to a filter coefficient neural network and a filtering compensation neural network.

As described above, neural network-based deblocking filtering is performed using the deblocking filtering coefficients 3265 obtained based on the neural network, the deblocking filtering DC compensation value 3270, and the deblocking filtering target pixel line 3210.

Specifically, a linear operation 3275 of matrix multiplication is performed using the deblocking filtering target pixel line 3210 and the deblocking filtering coefficient 3265, DC compensation 3280 is performed by adding the deblocking filtering compensation value 3270 to a result of the linear operation 3275, a residual filtering pixel line is obtained, and a deblocking filtered pixel line 3295 of 8×1 is obtained by adding 3290 the deblocking filtering target pixel line 3210 again to the residual filtering pixel line.

Figure 33:
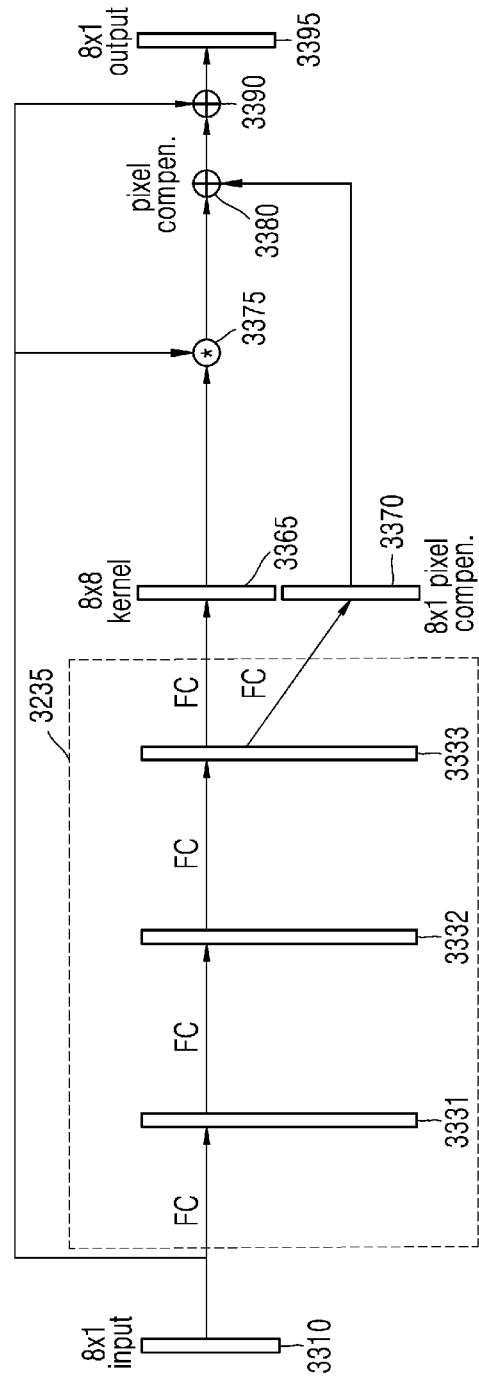
FIG. 33 is a diagram illustrating a structure of neural network-based deblocking filtering according to an embodiment of the disclosure.

FIG. 33 is a diagram illustrating a structure of neural network-based deblocking filtering according to an embodiment of the disclosure.

Referring to FIG. 33, the size of a deblocking filter target pixel line is 8×1, which means one line including 8 pixels.

A first intermediate feature map 3331 is obtained by inputting a deblocking filtering target pixel line 3310 to the fully-connected layer FC, a second intermediate feature map 3332 is obtained by inputting the first intermediate feature map 3331 to the fully-connected layer FC, and a feature map 3333 with respect to the deblocking filtering target pixel line 3310 is consequently extracted by inputting the second intermediate feature map 3332 to the fully-connected layer FC. Here, the input to the fully-connected layer FC three times corresponds to a feature extraction neural network 3335.

A deblocking filtering coefficient 3365 of an 8×8 kernel is obtained by inputting the feature map 3333 of the deblocking filtering target pixel line 3310 to the fully-connected layer FC, and a deblocking filtering compensation value 3370 of 8×1 is obtained by inputting the feature map 3333 of the deblocking filtering target pixel line 3310 to the fully-connected layer FC. Here, the inputs to the fully-connected layer FC respectively correspond to a filter coefficient neural network and a filtering compensation neural network.

As described above, neural network-based deblocking filtering is performed using the deblocking filtering coefficient 3365 and the deblocking filtering compensation value 3370 obtained based on the neural network, and the deblocking filtering target pixel line 3310.

Specifically, a linear operation 3375 of matrix multiplication is performed using the deblocking filtering target pixel line 3310 and the deblocking filtering coefficient 3365, a residual filtering pixel line is obtained by adding the deblocking filtering compensation value 3370 to a result of the linear operation 3375, and a deblocking filtered pixel line 3395 of 8×1 is obtained by adding 3390 the deblocking filtering target pixel line 3310 again to the residual filtering pixel line.

Figure 34:
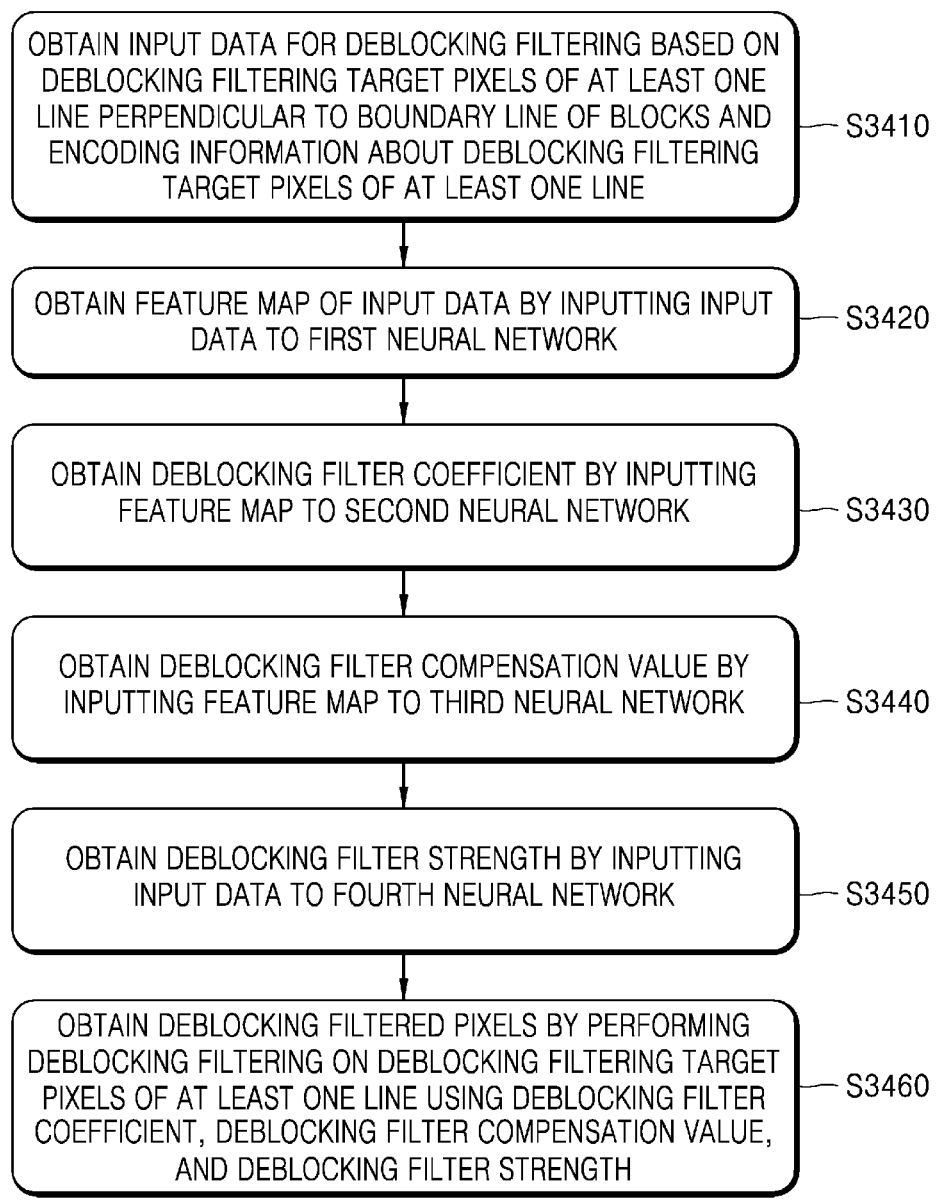
FIG. 34 is a flowchart of an image processing method using neural network-based deblocking filtering according to an embodiment of the disclosure.

FIG. 34 is a flowchart of an image processing method using neural network-based deblocking filtering according to an embodiment of the disclosure.

Referring to FIG. 34, in operation S3410, an image processing apparatus 3500 obtains input data for deblocking filtering based on deblocking filtering target pixels of at least one line perpendicular to a boundary line of blocks and encoding information about the deblocking filtering target pixels of at least one line.

According to an embodiment of the disclosure, the encoding information may be output through a fully-connected neural network including a plurality of fully-connected layers and then converted to the same size as that of the deblocking filtering target pixels of at least one line.

According to an embodiment of the disclosure, the deblocking filtering target pixels of at least one line are 2n pixels including n pixels in one direction perpendicular to the boundary line of blocks and n pixels in the other direction perpendicular to the boundary line.

According to an embodiment of the disclosure, the encoding information may not be included in the input data.

In operation S3420, the image processing apparatus 3500 obtains a feature map of the input data by inputting the input data to a first neural network.

According to an embodiment of the disclosure, the first neural network may include a plurality of residual blocks.

According to an embodiment of the disclosure, the first neural network may include a plurality of fully-connected layers.

According to an embodiment of the disclosure, the first neural network may include a plurality of convolutional layers.

In operation S3430, the image processing apparatus 3500 obtains a deblocking filter coefficient by inputting the feature map to a second neural network.

According to an embodiment of the disclosure, the second neural network may include at least one residual block.

According to an embodiment of the disclosure, the second neural network may include at least one fully-connected layer.

According to an embodiment of the disclosure, the second neural network may include at least one convolutional layer.

In operation S3440, the image processing apparatus 3500 obtains a deblocking filter compensation value by inputting the feature map to a third neural network.

According to an embodiment of the disclosure, the third neural network may include at least one residual block.

According to an embodiment of the disclosure, the third neural network may include at least one fully-connected layer.

According to an embodiment of the disclosure, the third neural network may include at least one convolutional layer.

According to an embodiment of the disclosure, the deblocking filter compensation value may not be obtained, and the deblocking filter compensation value may be set to 0.

In operation S3450, the image processing apparatus 3500 obtains a deblocking filter strength by inputting the input data to a fourth neural network.

According to an embodiment of the disclosure, the fourth neural network may include at least one convolutional layer.

According to an embodiment of the disclosure, the deblocking filter strength may not be obtained, and the deblocking filter strength may be set to 1.

According to an embodiment of the disclosure, the deblocking filter compensation value and the deblocking filter strength may not be obtained, the deblocking filter compensation value may be set to 0, and the deblocking filter strength may be set to 1.

In operation S3460, the image processing apparatus 3500 obtains deblocking filtered pixels by performing deblocking filtering on the deblocking filtering target pixels of at least one line using the deblocking filter coefficient, the deblocking filter compensation value, and the deblocking filter strength.

According to an embodiment of the disclosure, a scaling factor may be additionally used for deblocking filtering.

According to an embodiment of the disclosure, the scaling factor may be determined according to a type of a frame including the deblocking filtering target pixels of at least one line.

According to an embodiment of the disclosure, the image processing apparatus 3500 may obtain a matrix multiplication result by performing matrix multiplication of the deblocking filter coefficient and the deblocking filtering target pixels of at least one line, obtain a filter compensation result by adding the deblocking filter compensation value to the matrix multiplication result, obtain residual deblocking filtering pixels by performing an elementwise product on the filter compensation result using the deblocking filter strength, and obtain deblocking filtered pixels by adding the residual deblocking filtering pixels to the deblocking filtering target pixels of at least one line.

According to an embodiment of the disclosure, the image processing apparatus 3500 may obtain a matrix multiplication result by performing matrix multiplication of the deblocking filter coefficient and the deblocking filtering target pixels of at least one line, obtain a filter compensation result by adding the deblocking filter compensation value to the matrix multiplication result, and obtain deblocking filtered pixels by performing an elementwise product on the filter compensation result using the deblocking filter strength.

Figure 35:
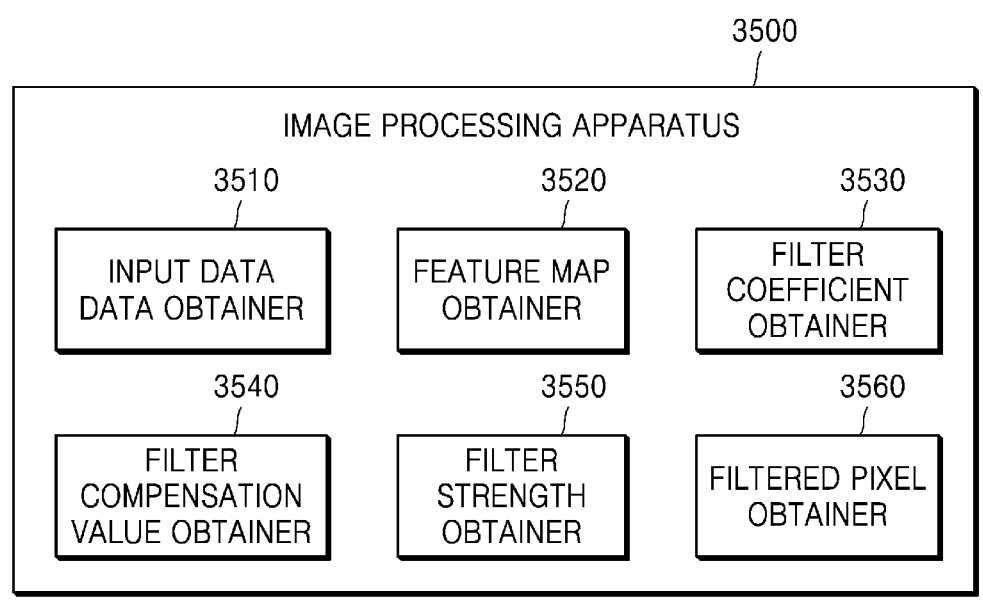
FIG. 35 is a diagram illustrating an image processing apparatus using neural network-based deblocking filtering according to an embodiment of the disclosure.

FIG. 35 is a diagram illustrating a configuration of an image processing apparatus using neural network-based deblocking filtering according to an embodiment of the disclosure.

Referring to FIG. 35, the image processing apparatus 3500 includes an input data obtainer 3510, a feature map obtainer 3520, a filter coefficient obtainer 3530, a filter compensation value obtainer 3540, a filter strength obtainer 3550, and a filtered pixel obtainer 3560.

The input data obtainer 3510, the feature map obtainer 3520, the filter coefficient obtainer 3530, the filter compensation value obtainer 3540, the filter strength obtainer 3550, and the filtered pixel obtainer 3560 may be implemented as neural processors, and the input data obtainer 3510, the feature map obtainer 3520, the filter coefficient obtainer 3530, the filter compensation value obtainer 3540, the filter strength obtainer 3550, and the filtered pixel obtainer 3560 may operate according to instructions stored in a memory.

FIG. 35 individually illustrates the input data obtainer 3510, the feature map obtainer 3520, the filter coefficient obtainer 3530, the filter compensation value obtainer 3540, the filter strength obtainer 3550, and the filtered pixel obtainer 3560, but the input data obtainer 3510, the feature map obtainer 3520, the filter coefficient obtainer 3530, the filter compensation value obtainer 3540, the filter strength obtainer 3550, and the filtered pixel obtainer 3560 may be implemented through one processor. In this case, the input data obtainer 3510, the feature map obtainer 3520, the filter coefficient obtainer 3530, the filter compensation value obtainer 3540, the filter strength obtainer 3550, and the filtered pixel obtainer 3560 may be implemented as a dedicated processor, or may be implemented through a combination of software and a general-purpose processor such as an application processor (AP), central processing unit (CPU), graphic processing unit (GPU), or neural processing unit (NPU). In addition, the dedicated processor may include a memory for implementing an embodiment of the disclosure or may include a memory processing unit for using an external memory.

The input data obtainer 3510, the feature map obtainer 3520, the filter coefficient obtainer 3530, the filter compensation value obtainer 3540, the filter strength obtainer 3550, and the filtered pixel obtainer 3560 may include a plurality of processors. In this case, the input data obtainer 3510, the feature map obtainer 3520, the filter coefficient obtainer 3530, the filter compensation value obtainer 3540, the filter strength obtainer 3550, and the filtered pixel obtainer 3560 may be implemented through a combination of dedicated processors or may be implemented through a combination of software and a plurality of general-purpose processors such as an AP, a CPU, or a GPU.

The input data obtainer 3510 obtains input data for deblocking filtering based on deblocking filtering target pixels of at least one line perpendicular to a boundary line of blocks and encoding information about the deblocking filtering target pixels of at least one line.

The feature map obtainer 3520 obtains a feature map of the input data by inputting the input data to a first neural network.

The filter coefficient obtainer 3530 obtains a deblocking filter coefficient by inputting the feature map to a second neural network.

The filter compensation value obtainer 3540 obtains a deblocking filter compensation value by inputting the feature map to a third neural network.

The filter strength obtainer 3550 obtains a deblocking filter strength by inputting the input data to a fourth neural network.

The filtered pixel obtainer 3560 obtains deblocking filtered pixels by performing deblocking filtering on the deblocking filtering target pixels of at least one line using the deblocking filter coefficient, the deblocking filter compensation value, and the deblocking filter strength.

A machine-readable storage medium may be provided as a non-transitory storage medium. Here, 'non-transitory' means that the storage medium does not include a signal and is tangible, but does not distinguish whether data is stored semi-permanently or temporarily in the storage medium. For example, the 'non-transitory storage medium' may include a buffer in which data is temporarily stored.

According to an embodiment of the disclosure, methods according to various embodiments of the disclosure may be provided in a computer program product. The computer program product is a product purchasable between a seller and a purchaser. The computer program product may be distributed in the form of a machine-readable storage medium (e.g., a compact disc read-only memory (CD-ROM)), or be electronically distributed (e.g., downloaded or uploaded) via an application store or directly between two user devices (e.g., smartphones). When distributed online, at least a part of the computer program product (e.g., a downloadable application) may be temporarily generated or at least temporarily stored in a machine-readable storage medium, such as a memory of a server of a manufacturer, a server of an application store, or a relay server.

The foregoing exemplary embodiments are merely exemplary and are not to be construed as limiting. The present teaching can be readily applied to other types of apparatuses. Also, the description of the exemplary embodiments is intended to be illustrative, and not to limit the scope of the claims, and many alternatives, modifications, and variations will be apparent to those skilled in the art.

What is claimed is:

1. An image processing method using neural network-based deblocking filtering, the image processing method comprising:
    obtaining input data for deblocking filtering based on deblocking filtering target pixels of at least one line perpendicular to a boundary line of blocks and encoding information about the deblocking filtering target pixels of at least one line;
    obtaining a feature map of the input data by inputting the input data to a first neural network;
    obtaining a deblocking filter coefficient by inputting the feature map to a second neural network;
    obtaining a deblocking filter compensation value by inputting the feature map to a third neural network;
    obtaining a deblocking filter strength by inputting the input data to a fourth neural network;
    obtaining deblocking filtered pixels by performing deblocking filtering on the deblocking filtering target pixels of the at least one line perpendicular to the boundary line of the blocks using the deblocking filter coefficient, the deblocking filter compensation value and the deblocking filter strength.

2. The image processing method of claim 1, wherein the encoding information is output through a plurality of fully-connected layers and then is converted to a same size as a size of the deblocking filtering target pixels of the at least one line.

3. The image processing method of claim 1, further comprising:
    determining a scaling factor according to a temporal layer type of a frame comprising the deblocking filtering target pixels of the at least one line; and
    applying the scaling factor to the deblocking filtering.

4. The image processing method of claim 3, wherein the determining the scaling factor comprises:
    setting the scaling factor for an intra frame to be lower than the scaling factor for a non-intra frame.

5. The image processing method of claim 1, wherein the obtaining of the deblocking filtered pixels comprises:
    obtaining a matrix multiplication result by performing matrix multiplication of the deblocking filter coefficient and the deblocking filtering target pixels of the at least one line;
    obtaining a filter compensation result by adding the deblocking filter compensation value to the matrix multiplication result;
    performing residual deblocking filtering pixels by performing an elementwise product on the filter compensation result using the deblocking filter strength; and
    obtaining the deblocking filtered pixels by adding the residual deblocking filtering pixels to the deblocking filtering target pixels of the at least one line.

6. The image processing method of claim 1, wherein the obtaining of the deblocking filtered pixels comprises:
    obtaining a matrix multiplication result by performing matrix multiplication of the deblocking filter coefficient and the deblocking filtering target pixels of the at least one line;
    obtaining a filter compensation result by adding the deblocking filter compensation value to the matrix multiplication result; and
    obtaining the deblocking filtered pixels by performing an elementwise product on the filter compensation result using the deblocking filter strength.

7. The image processing method of claim 1, wherein the first neural network comprises a plurality of residual blocks.

8. The method of claim 1, wherein the second neural network comprises a first residual block configured to process the feature map to obtain the deblocking filter coefficient.

9. The image processing method of claim 1, wherein the third neural network comprises a second residual block configured to process the feature map to obtain the deblocking filter compensation value.

10. The image processing method of claim 1, wherein the fourth neural network comprises a plurality of convolutional layers to process the input data to obtain the deblocking filter strength.

11. The image processing method of claim 1, wherein the deblocking filtering target pixels of the at least one line are 2n pixels comprising n pixels in one direction perpendicular to the boundary line of blocks and n pixels in another direction perpendicular to the boundary line, and wherein n is a natural number.

12. The image processing method of claim 1, wherein the encoding information comprises at least one of a coding unit mode, a coding unit size, and a quantization parameter.

13. The image processing method of claim 1, wherein
 the deblocking filter compensation value is not obtained, and
 the deblocking filter compensation value is set to 0.

14. The image processing method of claim 1, wherein
 the deblocking filter strength is not obtained, and
 the deblocking filter strength is set to 1.

15. An image processing apparatus using neural network-based deblocking filtering, the image processing apparatus comprising:

at least one memory storing one or more instructions; and at least one processor configured to execute the one or more instructions, to:

obtain input data for deblocking filtering based on deblocking filtering target pixels of at least one line perpendicular to a boundary line of blocks and encoding information about the deblocking filtering target pixels of the at least one line;

obtain a feature map of the input data by inputting the input data to a first neural network;

obtain a deblocking filter coefficient by inputting the feature map to a second neural network;

obtain a deblocking filter compensation value by inputting the feature map to a third neural network;

obtain a deblocking filter strength by inputting the input data to a fourth neural network; obtain deblocking filtered pixels by performing deblocking filtering on the deblocking filtering target pixels of the at least one line perpendicular to the boundary line of the blocks using the deblocking filter coefficient, the deblocking filter compensation value, and the deblocking filter strength.

* * * * *